US012262347B2

(12) United States Patent
He et al.

(10) Patent No.: US 12,262,347 B2
(45) Date of Patent: Mar. 25, 2025

(54) PAGING BASED ON CROSS-SLOT SCHEDULING

(71) Applicant: QUALCOMM Incorporated, San Diego, CA (US)

(72) Inventors: Linhai He, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 506 days.

(21) Appl. No.: 17/652,671

(22) Filed: Feb. 25, 2022

(65) Prior Publication Data

US 2022/0361144 A1  Nov. 10, 2022

Related U.S. Application Data

(60) Provisional application No. 63/186,696, filed on May 10, 2021.

(51) Int. Cl.
*H04W 68/02* (2009.01)
*H04W 72/23* (2023.01)

(52) U.S. Cl.
CPC ........... *H04W 68/02* (2013.01); *H04W 72/23* (2023.01)

(58) Field of Classification Search
CPC ..... H04W 68/02; H04W 72/23; H04W 84/12; H04W 36/14; H04W 36/36
See application file for complete search history.

(56) References Cited

U.S. PATENT DOCUMENTS

| 2020/0068526 | A1* | 2/2020 | Ji | H04W 52/02 |
| 2020/0169982 | A1* | 5/2020 | Höglund | H04W 68/025 |
| 2020/0313831 | A1* | 10/2020 | Kim | H04W 72/23 |
| 2020/0404617 | A1* | 12/2020 | Murray | H04W 68/02 |
| 2021/0250153 | A1* | 8/2021 | Lin | H04W 72/0446 |
| 2021/0314979 | A1* | 10/2021 | Agiwal | H04W 88/06 |
| 2022/0174603 | A1* | 6/2022 | Maleki | H04W 68/005 |
| 2022/0279480 | A1* | 9/2022 | Kuang | H04W 88/08 |
| 2022/0286964 | A1* | 9/2022 | Peng | H04W 52/0229 |

* cited by examiner

*Primary Examiner* — Christine Ng
(74) *Attorney, Agent, or Firm* — Procopio, Cory, Hargreaves & Savitch LLP/Qualcomm

(57) ABSTRACT

A first user equipment (UE) that does not support cross-slot scheduling (CSS) and a second UE that supports the CSS may share a paging occasion (PO), and a base station that supports CSS may configure a set of variable K0 greater than zero to the second UE. The base station may page both the first UE and the second UE in the shared PO by transmitting a first paging message for the first UE in the shared PO with K=0, and transmitting a second paging message for the second UE transmitted in the subsequent PO. The first UE may receive a paging scheduling physical downlink control channel (PDCCH) with K0=0 in the shared PO and monitor consecutive POs subsequent to the shared PO to receive the paging message. The base station may also assign separate sets of POs to the CSS-capable UE and the CSS-incapable UE.

22 Claims, 14 Drawing Sheets

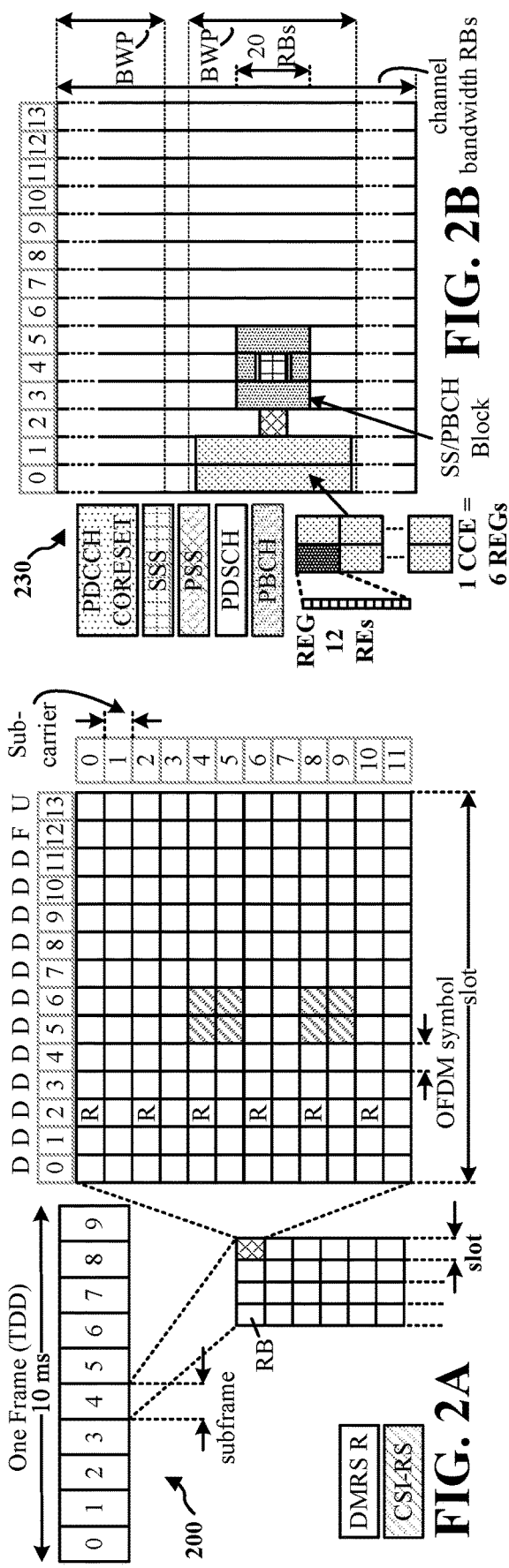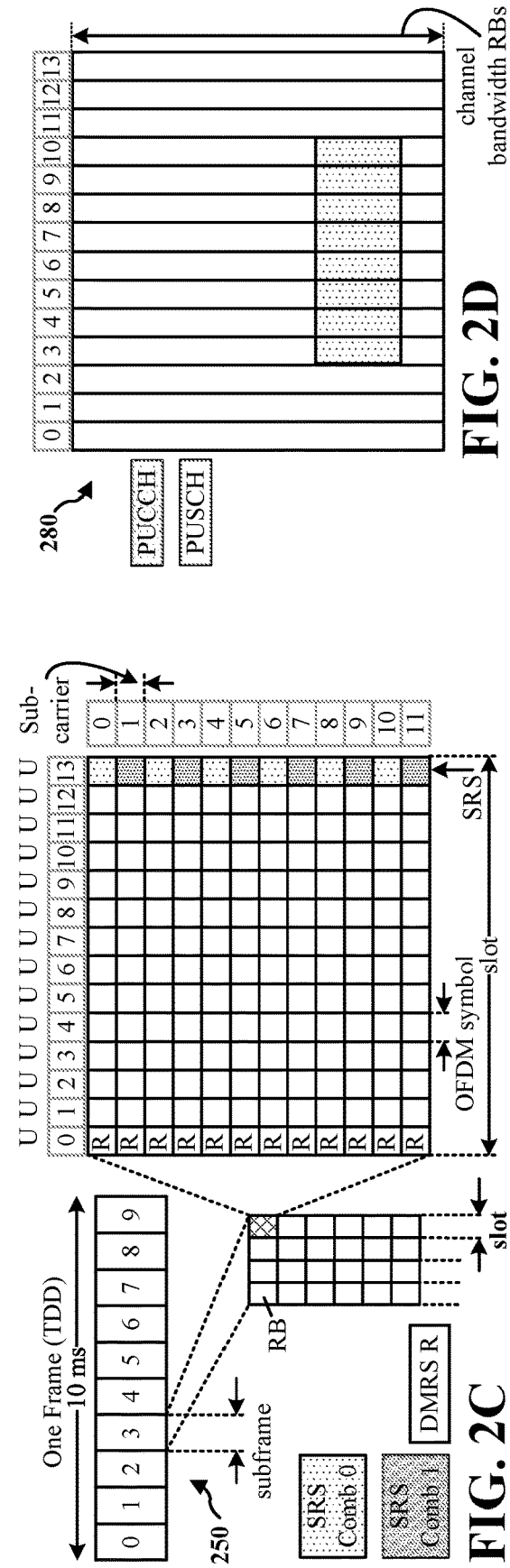

PAGING BASED ON CROSS-SLOT SCHEDULING

CROSS REFERENCE TO RELATED APPLICATION(S)

This application claims the benefit of and priority to U.S. Provisional Application Ser. No. 63/186,696, entitled "PAGING BASED ON CROSS-SLOT SCHEDULING" and filed on May 10, 2021, which is expressly incorporated by reference herein in its entirety.

TECHNICAL FIELD

The present disclosure relates generally to communication systems, and more particularly, to a method of a wireless communication including a paging.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station, a first user equipment (UE) that does not support a cross-slot scheduling (CSS), and a second UE that supports the CSS. The first UE and the second UE may share a PO, and a base station that supports CSS may configure a set of K0 greater than zero to the second UE. The base station may transmit a paging physical downlink control channel (PDCCH) indication in the shared paging occasion (PO) to a plurality of UEs that share the PO and transmit a paging message for each of the plurality of UEs in the shared PO or a subsequent PO based on whether the plurality of UEs supports CSS. The base station may transmit a first paging message for the first UE in the shared PO with K=0 and a second paging message for the second UE transmitted in the subsequent PO.

The first UE may receive a paging scheduling PDCCH with K0=0 in the shared PO and monitor consecutive POs subsequent to the shared PO to receive the paging message. In some aspects, the UE may identify that the paging message was not received for N consecutive POs and initiate a cell reselection procedure.

In some aspects, the base station may also assign separate sets of POs to the first UE and the second UE. The base station may transmit separate sets of parameters of PO to the first UE and the second UE, assigning a first PO or a first PF to the first UE and assigning a second PO or a second PF to the second UE. The first PO and the second PO may be orthogonal to each other.

In one aspect, the set of parameters may include a parameter associated with a number of total paging frames in one DRX cycle and a paging frame offset for determining an index number of PF. In another aspect, the set of parameters may include a parameter associated with a first PDCCH monitoring occasion for each PO for determining an index of the PO.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
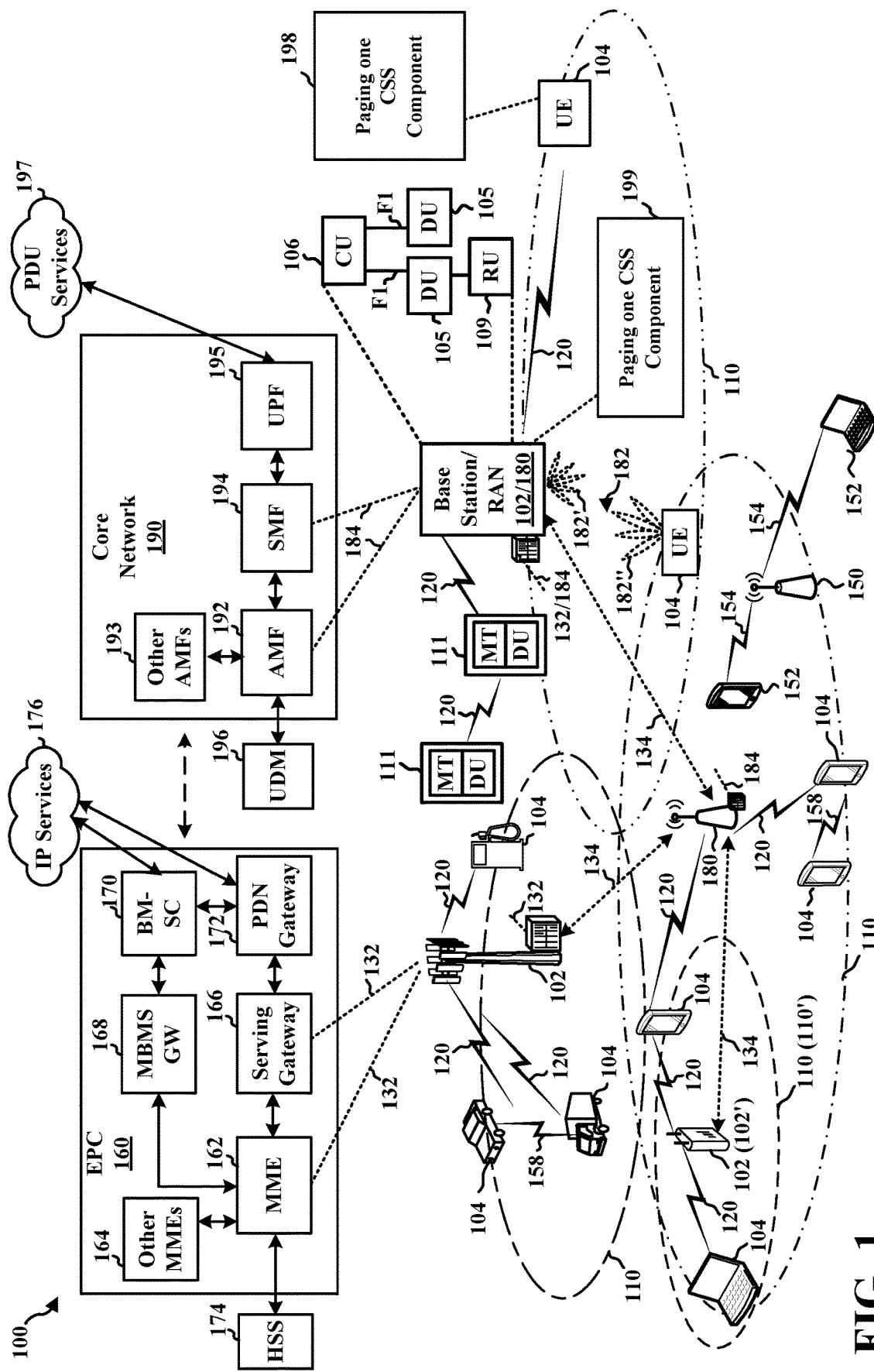
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user plane PDU session packets, e.g. IP, Ethernet, or unstructured packets, are transferred through the UPF 195. The UPF 195 may provide UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a paging on CSS component 198 configured to receive a PDCCH indication, in a first PO, indicating a paging message available for the UE, and monitor the PO to receive the paging message if a slot offset signaled in the PDCCH indication is greater than or equal to one or a second PO to receive the paging message if the slot offset is zero, the second PO being different from the first PO. In certain aspects, the base station 180 may include a paging on CSS component 199 configured to transmit a paging PDCCH indication in a PO to a plurality of UEs that share the PO, and transmit a paging message for each of the plurality of UEs in at least one of a first PO or a second PO based on whether the plurality of UEs supports CSS. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
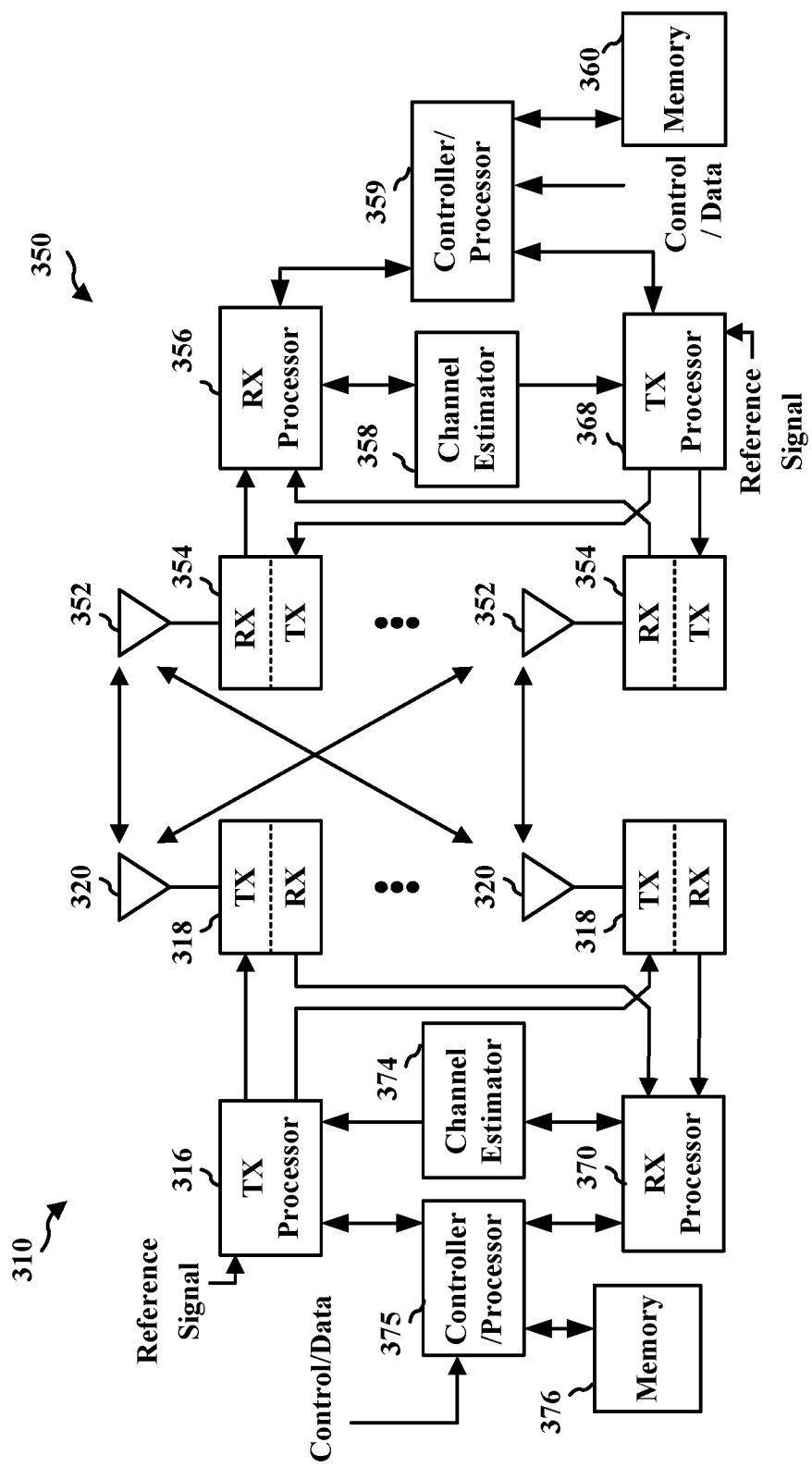
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
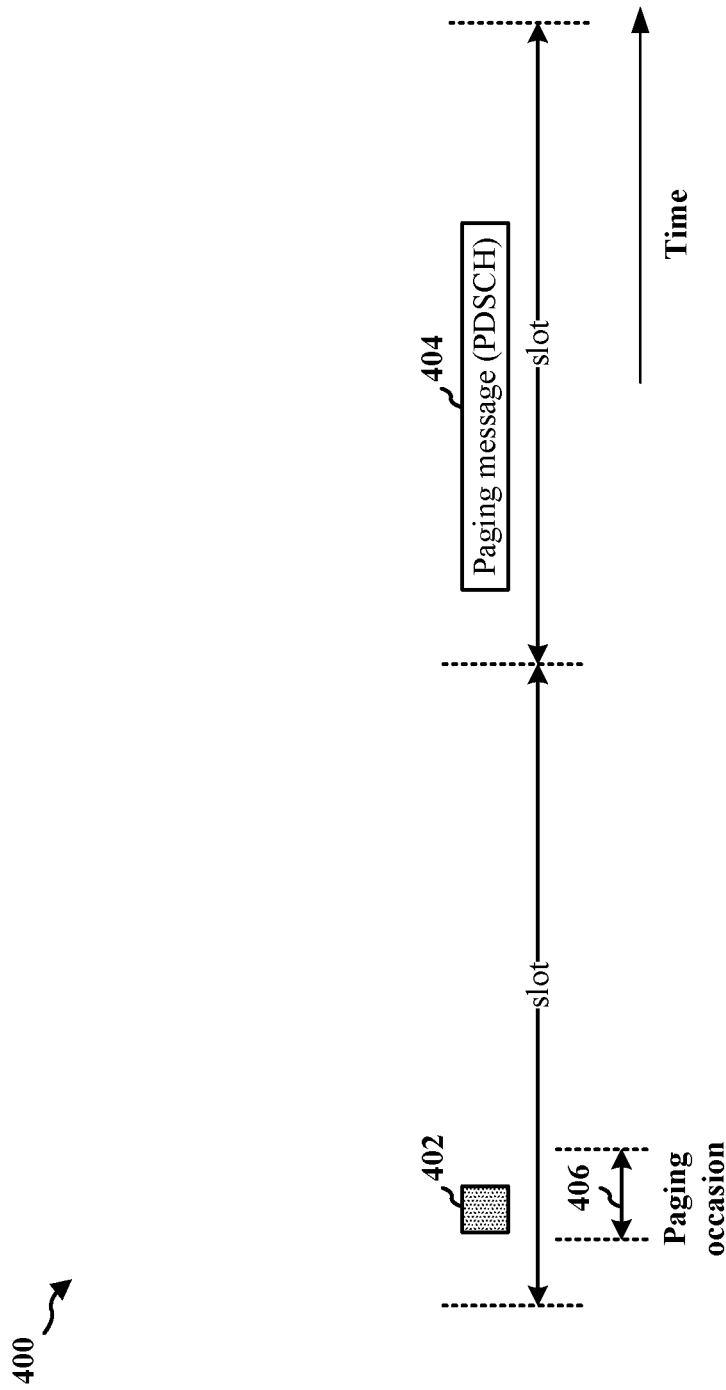
FIG. 4 illustrates an example time diagram 400 showing an example of CSS.

Some aspects of wireless communications can include a cross-slot scheduling (CSS), which is when a PDCCH transmitted in a first slot is used to send a DCI to schedule a PDSCH in a second slot different from the first slot. FIG. 4 illustrates an example time diagram 400 showing an example of CSS. The example time diagram 400 shows that a PDCCH 402 is transmitted in a paging occasion 406 of one slot and schedules a paging message (e.g., PDSCH 404) in a different slot than the slot in which the PDCCH is transmitted. That is, a UE may receive the PDCCH including the scheduling DCI in the first slot, and the PDSCH including the data may be scheduled in a second slot, and therefore, the data (i.e., PDSCH) transmitted with the CSS may be scheduled at least one slot later than the assignment (i.e., PDCCH). The CSS may be provided for one or more UEs in an RRC connected state, an RRC inactive state, or an RRC idle state.

In some aspects, the network may have a paging message directed to a UE in the RRC inactive state or the RRC idle state. The network may transmit a paging radio network temporary identifier (P-RNTI) on a PDCCH addressing the paging message, and transmit the paging message on a PDSCH scheduled by the PDCCH. The UE may periodically wake up to monitor the PDCCH and check for the presence of a paging message. A paging occasion (PO) may refer to multiple time slots, e.g., a subframe or an OFDM symbol, in which the base station may transmit the P-RNTI on the PDCCH addressing the paging message. A paging frame (PF) may refer to a radio frame that may contain one or more POs. The POs may be determined based on a randomized hashing of the ID of the UE.

The CSS may be provided for the RRC inactive state and the RRC idle state, and the base station may schedule, via the PDCCH, the PDSCH carrying the paging message on at least one slot later than transmission of the PDCCH scheduling the paging message. That is, the transmission of the PDSCH carrying the paging message may have a slot offset from the transmission of the PDCCH scheduling the PDSCH carrying the paging message. The base station may transmit an RRC message including a parameter in a system information block 1 (SIB1), the parameter indicating the slot offset supported by the base station between the PDCCH and the PDSCH. For example, the SIB1 may include an information element (IE), e.g., which may be referred to as a PDSCH-ConfigCommon, including a parameter that provides a time domain resource allocation (TDRA) table/list, which may be referred to as a pdsch-TimeDomainAllocationList, configuring variables K0. The value of the variable K0 indicates a relationship between the slot in which the PDCCH is received and the lost in which the PDSCH is scheduled. For example, K0 may indicate the minimum slot offset between the PDCCH and the PDSCH configured by the base station. If K0=0, the PDSCH is scheduled in the same slot as the PDCCH. If K0=1, the PDSCH is scheduled in the next slot after the slot in which the PDCCH is received. If K0=2, the PDSCH is scheduled the second slot after the slot in which the PDCCH is received, and so forth for additional K0 values. For example, the base station may configure that the K0 may indicate up to 16 values from 0 to 32. In some aspects, the K0 values supported by the base station may be configured via pdsch-TimeDomainAllocationList in SIB1 for the initial BWP for paging, system information (SI), random access (RA) in a PDSCH-ConfigCommon IE.

In one aspect, the base station may configure the CSS by indicating in the SIB1 that the minimum value of the configured K0 values is greater than or equal to one, and the base station may transmit the paging message with the CSS, e.g., in a different slot than the PDCCH scheduling the PDSCH. The UE may receive SIB1 indicating that the minimum value of the configured k0 values is greater than zero, and expect that the base station may transmit the paging message with CSS. In another aspect, the base station may indicate in the SIB1 that the configured K0 values include the value of 0, the base station may configure the paging message without the CSS by indicating in the PDCCH scheduling the paging message that the K0 is 0, and transmit the paging message on the PDSCH in the same slot without the CSS. The UE may receive the SIB1 indicating that the configured K0 values include the value of 0 and receive the PDCCH scheduling the paging message indicating that the K0 value is 0, and the UE may receive the PDSCH in the same slot without the CSS.

In some aspects, transmitting the paging message with the CSS may reduce power consumption on UE side. The scheduling PDCCH and the paging message are not transmitted in the same slot, and the UE may first activate or wake up a portion of the transceiver circuit (or chip/processor/component) to monitor/decode the PDCCH without activating additional portions that would be used to receive/decode the PDSCH. If the UE detects the PDCCH scheduling the paging message addressed to the UE, the UE may then proceed to wake up the additional portions of the transceiver circuit to receive the paging message on the PDSCH as scheduled by the PDCCH. That is, the UE may take a two-stage approach to wake up the transceiver circuit to receive the paging message, including a first step of partially waking up to monitor for the PDCCH in the PO, and second step of waking up to receive the paging message in response to determining that a paging message is scheduled for transmission in the first step. At times, the UE may monitor the PO and determined that no PDSCH is scheduled for the UE, e.g., no PDCCH is received for the UE. By partially waking up to monitor the paging occasion, the UE is able to return to a sleep state, or lower power state, without waking up the additional portions of the transceiver that would be used to receive the PDSCH. The partial wake up may include activating a portion of the circuit for monitoring the PDCCH, waking up a PDCCH processing block to receive PDCCH including the paging indication, or activating a dedicated circuit, e.g., a circuit that may be smaller and/or have less processing power or lower power consumption than the transceiver of the UE, for monitoring the PDCCH without waking up the rest of the transceiver of the device. The UE may wake up or activate the rest of the transceiver when the UE decodes the PDCCH scheduling the transmission of the paging message. Accordingly, the UE may have reduced power consumption and enhanced efficiency for processing the paging message when the UE has a low paging rate.

An interoperability testing (IoT) may determine whether the base station and the UE may establish and maintain the wireless communication link that may carry out the corresponding performance in prescribed test conditions. In some aspects, the UE may signal the base station with an indication that the UE may not have the IoT capabilities of certain features (or functions) to indicate that the UE may not support the certain features. In one aspect, the UE may not have the IoT capabilities for CSS, and the UE may transmit the CSS IoT capabilities to the network to indicate that the UE does not support the CSS. For example, the UE may transmit one or more parameters to a base station to indicate that the UE may not have the IoT capabilities to support the CSS in the paging. For example, the UE may signal two IoT capabilities, that is dl-SchedulingOffset-PDSCH-TypeA and dl-SchedulingOffset-PDSCH-TypeB, to indicate whether the UE may support CSS in the paging to the base station. The parameter dl-SchedulingOffset-PDSCH-TypeA may indicate whether the UE supports DL scheduling the slot offset (K0) greater than zero for PDSCH mapping type A, and dl-SchedulingOffset-PDSCH-TypeB may indicate whether the UE supports DL scheduling the slot offset (K0) greater than zero for PDSCH mapping type B. The base station may receive the one or more parameters from the UE indicating that the UE may not have the IoT capabilities to support the CSS in the paging, and the base station may not transmit, to the UE without the IoT capabilities, the paging message with CSS. That is, the base station may communicate with multiple UEs, and the multiple UEs may include one or more CSS-capable UEs and one or more CSS-incapable UEs.

In some aspects, multiple UEs may be assigned to a single PO. Each UE may determine the PO to monitor based on a randomized hashing of the ID of the UE, and a single PO may be assigned to the multiple UEs. Therefore, the CSS-capable UEs and the CSS-incapable UEs may be assigned to the same POs, according to their UE IDs, and the base station may transmit paging messages to the one or more CSS-capable UEs and the one or more CSS-incapable UEs in the same PO. The base station may multiplex the paging messages of the UEs assigned to the same POs in a single PDSCH. However, the network including the base station may not know whether the PO is shared by the two different types of UEs including the one or more CSS-capable UEs and the one or more CSS-incapable UEs. If the network uses a K0 value that is greater than 0, the CSS-incapable UEs may not receive the PDSCH. If the network uses a K0=0 in order to accommodate the CSS-incapable UEs, the CSS capable UE(s) are not able to achieve the power saving benefits of CSS.

Accordingly, the base station may configure the K0 values with the minimum value greater than zero in the SIB1 for the one or more CSS-capable UEs and have paging messages for the one or more CSS-capable UEs and the one or more CSS-incapable UEs that share the same PO. The base station may indicate, in the PDCCH, the K0 for transmitting the paging message in the PO shared by the two different types of UEs. In one aspect, the base station may configure the K0 in the PDCCH to have a value greater than or equal to one, i.e., K0≥1, indicating that the paging message is transmitted with the CSS. The base station may transmit the paging message with the CSS to the one or more CSS-incapable UEs sharing the PO with the one or more CSS-capable UEs, and the one or more CSS-incapable UEs may not properly receive the paging message transmitted with the CSS configured with the K0≥1.

In another aspect, the base station may configure the K0 in the PDCCH to have a value of 0, i.e., K0=0, to indicate that the paging message is transmitted without the CSS. The base station may transmit the paging message with the CSS to the one or more CSS-capable UEs within the shared PO, and the one or more CSS-capable UEs may not properly receive the paging message transmitted without the CSS in the same slot within the PO configured with the K0=0. Based on the K0 values configured with the minimum value greater than zero by the parameter, e.g., pdsch-TimeDomainAllocationList in PDSCH-ConfigCommon, received from the base station, the CSS-capable UEs may take the two-stage approach to wake up the transceiver circuit, and if the PDSCH carrying the paging message is received in the same slot that the PDCCH scheduling the paging message is received, the CSS-capable UEs may not have enough time to activate the rest of the transceiver of the CSS-capable UEs within the slot after decoding the PDCCH scheduling the paging message.

Aspects of the current disclosure may provide a method of transmitting paging messages to the one or more CSS-capable UEs and the one or more CSS-incapable UEs sharing the same PO, where the CSS-capable UEs may be scheduled based on K0 value≥1 and the CSS-incapable UEs may be scheduled with a K0 value of 0.

In some aspects, the network including the base station may assign the CSS-capable UEs and the CSS-incapable UEs to separate sets of PFs or POs. That is, the network may assign a first set of PFs to the one or more CSS-capable UEs and a second set of PFs to the one or more CSS-incapable UEs or assign a first set of POs to the one or more CSS-capable UEs and a second set of POs to the one or more CSS-incapable UEs. To assign different set of PFs or different POs to the one or more CSS-capable UEs and the one or more CSS-incapable UEs, and the network may configure separate paging configuration parameters for the CSS-capable UEs and the CSS-incapable UEs based on the network configuring K0≥1 in the SIM for the CSS-capable UEs. That is, when the base station transmits the SIB1 including an IE, e.g., PDSCH-ConfigCommon, including a parameter pdsch-TimeDomainAllocationList to configure the K0≥1 for the CSS-capable UEs, the base station may configure at least one of the PFs or the POs differently for the one or more CSS-capable UEs and the one or more CSS-incapable UEs.

The PFs may be determined based on a set of parameters including a PF offset, a discontinuous receive (DRX) cycle, a number of total PFs in the DRX cycle, and an ID of the UE. For example, the SFN of the PFs may be determined based on the following formula: (SFN+PF_offset) mod T=(T div N)*(UE_ID mod N), where PF_offset may refer to the PF offset, T may refer to the DRX cycle, N may refer to the number of total PFs in T, and the UE_ID may refer to the ID of the UE generated based on the following formula: (SAE-Temporary Mobile Subscriber Identity (S-TMSI) of the UE) mod 1024.

The PO may be determined based on a set of parameters including the ID of the UE, the number of total PFs in T, and a number of paging occasions for each PF. For example, an index (i_s) indicating the index of the PO may be determined based on the following formula:

$$i\_s = \text{floor}\left(\frac{UE\_ID}{N}\right) \bmod Ns,$$

where the UE_ID may refer to the ID of the UE generated based on the following formula: (S-TMSI of the UE) mod 1024, N may refer to the number of total PFs in T, and Ns may refer to the number of paging occasions for each PF.

The network including base station may configure different sets of parameters for the one or more CSS-capable UEs and the one or more CSS-incapable UEs to assign different sets of PFs or POs for the one or more CSS-capable UEs and the one or more CSS-incapable UEs. That is, the base station may configure a first set of parameters for the one or more CSS-capable UEs to assign the first set of POs or the first set of PFs to the one or more CSS-capable UEs, and configure a second set of parameters for the one or more CSS-capable UEs to assign the second set of POs or the second set of PFs to the one or more CSS-incapable UEs.

In one aspect, the base station may configure a first set of parameters to assign the first set of PFs to the one or more CSS-capable UEs, and a second set of parameters to assign the second set of PFs to the one or more CSS-incapable UEs. For one example, the base station may assign the PFs differently for the one or more CSS-capable UEs and the one or more CSS-incapable UEs using different parameters, e.g., nAndPagingFrameOffset, indicating the number of total paging frames in one DRX cycle and the paging frame offset. The parameters may be transmitted in a configuration of paging control channel (PCCH), e.g., pcch-Config, via the SIB2.

In another aspect, the base station may configure a first set of parameters to assign the first set of POs to the one or more CSS-capable UEs, and a second set of parameters to assign the second set of POs to the one or more CSS-incapable UEs. For one example, the base station may assign the POs differently for the one or more CSS-capable UEs and the one or more CSS-incapable UEs using different parameters, e.g., firstPDCCH-MonitoringOccasionOfPO, indicating a first physical downlink control channel (PDCCH) monitoring occasion for each PO.

In some aspects, the base station may configure the first set of parameters and the second set of parameters such that the first set of PFs and the second set of PFs may be orthogonal to each other, and the first set of POs and the second set of POs may be orthogonal to each other. Accordingly, the first set of PFs and the second set of PFs may not overlap with each other, and the first set of POs and the second set of POs may not overlap with each other.

In some aspects, the network including the base station may transmit paging messages differently for the one or more CSS-capable UEs and the one or more CSS-incapable UEs sharing the same PO without assigning dedicated PFs or POs. The network may have paging messages addressed to one or more UEs, and the core network may transmit an N2 paging notification message to the RAN, the N2 paging notification message including an indication whether the UE supports the CSS. In some aspects, the multiple UEs, including the one or more CSS-capable UEs and the one or more CSS-incapable UEs may be assigned to a single PO and paged at the same time, and the base station may multiplex the paging messages of the multiple UEs sharing the same POs in a single PDSCH.

In one aspect, the base station may not support the CSS. The base station that may not support the CSS may indicate the multiple UEs that the K0 may have the value of 0. For example, the base station may transmit the SIB1 including the IE, e.g., PDSCH-ConfigCommon, including a parameter pdsch-TimeDomainAllocationList configuring variables K0=0. The multiple UEs including the one or more CSS-capable UEs and the one or more CSS-incapable UEs may be indicated that base station may transmit the paging message without the CSS, i.e., in the same slot with the PDCCH scheduling the paging message.

In another aspect, the base station may support the CSS. The base station that may support the CSS may indicate the multiple UEs that the K0 may have the value greater than zero. For example, the base station may transmit the SIB1 including the IE, e.g., PDSCH-ConfigCommon, including a parameter pdsch-TimeDomainAllocationList configuring variables K0≥1. In one aspect, the base station may determine that all target UEs of the paging message in the current PO are CSS-capable. When the base station determines that all the target UEs of the paging message in the current PO are CSS-capable, the base station may use the slot offset of K0≥1 when scheduling the PDSCH carrying the paging message. The target UEs with the CSS capabilities may monitor the PO for the PDCCH, and receive the paging messaged in the scheduled PDSCH at the slot offset of K0≥1.

In another aspect, the base station may determine that the target UEs may include at least one CSS-incapable UE sharing the current PO with the CSS-capable UEs. When the base station determines that at least one of the target UEs in the current PO does not have the CSS capability, the base station may use the slot offset of K0=0 to schedule the PDSCH carrying the paging messages. The base station may indicate in the PDCCH scheduling the paging messages that the slot offset K0=0. Accordingly, at least one CSS-incapable UE of the target UEs may successfully receive the paging message from the PDSCH that is scheduled in the same slot as the PDCCH scheduling the PDSCH carrying the paging messages. However, the CSS-capable UEs of the target UEs may not successfully receive the paging message on the PDSCH that is scheduled in the same slot as the PDCCH scheduling the PDSCH carrying the paging messages. The CSS-capable UEs of the target UEs may be operating in CSS based on the base station indication that the K0 may have the value greater than zero. Accordingly, the CSS-capable UEs of the target UEs may be able to decode the PDCCH scheduling the PDSCH carrying the paging message, but may not timely decode the PDSCH scheduled in the same slot with the scheduling PDCCH.

Since the CSS-capable UEs of the target UEs may not successfully receive the paging message on the PDSCH transmitted in the same slot with the scheduling PDCCH, the base station may transmit the paging messages for the CSS-capable UEs of the target UEs in a subsequent PO again while maintaining the slot offset of K0=0. That is, the base station may retransmit the paging messages for the CSS-capable UEs in the subsequent PO with the slot offset of K0=0, and the CSS-capable UEs of the target UEs that were not able to timely decode the PDSCH scheduled in the same slot with the scheduling PDCCH in the current PO may be ready to successfully reduce the paging message in the subsequent PO.

In some aspects, the UE with the CSS capability may perform the following step in association with the operation of the base station. In one aspect, the network including the base station may not have the CSS capability, and the base station may indicate the UE with the CSS capability that the K0 may have the value of 0. Based on receiving the indication of the slot offset K0=0, the UE with the CSS capability may operate without the CSS to receive the paging message from the base station, and expect to receive the PDSCH carrying the paging message in the same slot of the PDCCH scheduling the PDSCH carrying the paging message. That is, the UE may perform a single-stage wake up procedure to be ready to monitor for the scheduling PDCCH and receive the paging message in the PDSCH scheduled by the scheduling PDCCH.

In another aspect, the network including the base station may support the CSS, and the base station that may support the CSS may indicate the multiple UEs that the K0 may have the value greater than zero. Based on receiving the indication of the slot offset K0≥1, the UE with the CSS capability may operate with the CSS to receive the paging message from the base station, and expect to receive the PDSCH carrying the paging message in a slot subsequent to the slot of the PDCCH scheduling the PDSCH carrying the paging message at the slot offset K0.

First, the CSS-capable UE may enter a CSS-enabled state. In the CSS-enabled state, the UE may operate under the CSS with the slot offset K0≥1 to receive the paging message from the base station. Based on the he indication of the slot offset K0≥1 received from the base station, the UE may take the two-stage approach to first perform a limited wake up of the transceiver circuit to monitor the PDCCH scheduling PDSCH carrying the paging message, and subsequently perform a full wake up of the transceiver circuit to receive the PDSCH carrying the paging message in the slot at the slot offset of K0 from the slot of the scheduling PDCCH.

The CSS-capable UE may operate in the CSS-enabled state until the UE receives a PDCCH indicating that the slot offset K0 is 0. The base station may determine that the target UEs sharing the current PO with the CSS-capable UE may include at least one CSS-incapable UE, and the base station may determine to use the slot offset of K0=0 when scheduling the PDSCH carrying the paging messages.

In response to receiving the PDCCH scheduling the PDSCH carrying the paging message indicating the slot offset K0=0, the UE operating in the CSS-enabled state may switch to a CSS-disabled state. The UE operating in the CSS-disabled state may monitor subsequent POs. That is, the CSS-capable UE may wake up the transceiver circuit and monitor the subsequent POs. The base station may transmit the paging messages for the CSS-capable UEs of the target UEs in a subsequent PO again while maintaining the slot offset of K0=0, and the CSS-capable UE operating in the CSS-disabled state may monitor the subsequent POs to receive the paging messages transmitted in one of the subsequent POs. The subsequent POs may include CSS. That is, the subsequent POs may include a first subsequent PO having CSS with the slot offset of K0≥1, and a second subsequent PO with no CSS and the slot offset of K0=0. Accordingly, the CSS capable UE operating in the CSS-disabled state may monitor for the PDCCH scheduling the PDSCH carrying the paging message for the CSS capable UE, and the UE based on the slot offset K0 indicated in the scheduling PDCCH. For one example, the base station may transmit the paging messages for CSS-capable UEs in the first subsequent PO, and the base station may indicate in the scheduling PDCCH that the slot offset K0 is greater than or equal to one in the first subsequent PO. For another example, the base station may transmit the paging messages for at least one CSS-incapable UE in the second subsequent PO, and the base station may indicate in the scheduling PDCCH that the slot offset K0 is zero in the second subsequent PO. Once the CSS-capable UE receives the paging message in in one PO of the subsequent POs, and the CSS-capable UE operating in the CSS-disabled state may switch back to the CSS-enabled state.

The CSS-capable UE operating in the CSS-disabled state may monitor every subsequent POs subsequent to the current PO with the slot offset K0=0. For example, every subsequent POs may include POs that are not assigned to the CSS-capable UE by default. Since the base station may transmit the paging messages for the CSS-capable UEs of the target UEs in one of the subsequent POs, the CSS-capable UE operating in the CSS-disabled state may receive the paging message for the CSS-capable UE in one of the subsequent POs. In one aspect, the CSS-capable UE may determine or identify that the CSS-capable UE did not receive the paging message for N consecutive POs provided subsequent to the current PO. That is, the CSS-capable UE, operating in the CSS-disabled state may determine or identify that the paging message was not received from the base station for N consecutive POs, and the CSS-capable UE may modify the upper-layer and initiate the cell reelection procedure.

Figure 5:
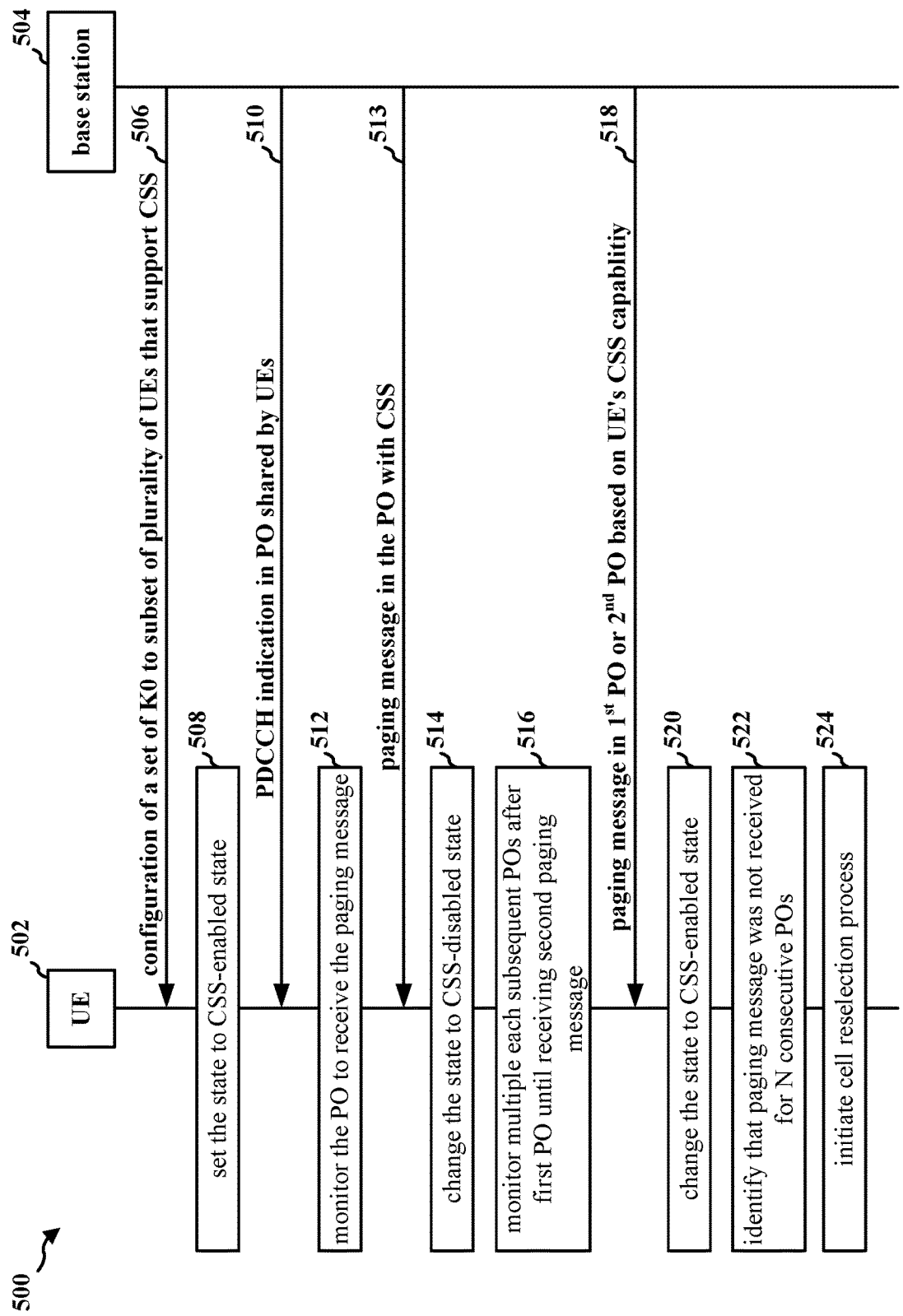
FIG. 5 is a communication diagram of a method of wireless communication.

FIG. 5 is a communication diagram 500 of a method of wireless communication. The communication diagram 500 may include a UE 502 and a base station 504. Here, the UE 502 may be a CSS-capable UE that supports the CSS, and the base station 504 may support the CSS. The base station 504 may transmit paging messages for the one or more CSS-capable UEs and the one or more CSS-incapable UEs sharing the same PO without assigning dedicated PFs or POs.

At 506, the base station 504 may transmit a configuration of a set of slot offsets to a subset of the plurality of UEs that supports the CSS, where a minimum value of the set of slot offsets is greater than or equal to one, and the UE 502 may receive a configuration of a set of slot offsets to a subset of the plurality of UEs that supports the CSS, where a minimum value of the set of slot offsets is greater than or equal to one. For example, the base station 504 may transmit the SIB1 including the IE, e.g., PDSCH-ConfigCommon, including a parameter pdsch-TimeDomainAllocationList configuring variables K0≥1. Here, the configuration may be transmitted via the SIB1.

At 508, the UE 502 may set the state to CSS-enabled state based on receiving the configuration of the set of slot offsets including the minimum value of the set of slot offsets greater than or equal to one.

At 510, the base station 504 may transmit a paging PDCCH indication in a PO to a plurality of UEs that share the PO, and the UE 502 may receive a paging PDCCH indication, in a first PO, indicating a paging message available for the UE 502. In one aspect, the plurality of UEs sharing the PO may all support the CSS, and the PDCCH indication may include a slot offset between a PDCCH scheduling the paging message and a corresponding paging message carrying a PDSCH greater than or equal to one. In another aspect, the plurality of UEs sharing the PO may include a first UE that does not support the CSS and a second UE that supports the CSS, and the PDCCH indication may include a slot offset between a PDCCH scheduling the paging message and a corresponding paging message carrying a PDSCH set to zero.

In one aspect, the base station 504 may transmit, at 510, the PDCCH indication including a slot offset between a PDCCH scheduling the paging message and a corresponding paging message carrying a PDSCH greater than or equal to one based on determining that the plurality of UEs sharing the PO may all support the CSS.

At 512, the UE 502 may monitor the first PO to receive the paging message with CSS based on the received configuration indicating that the slot offset being great than or equal to 1. That is, the UE 502 may maintain the CSS-enabled state as set at 508, and monitor the first PO for the paging message with CSS in response to receiving, at 510, the PDCCH indication including a slot offset between a PDCCH scheduling the paging message and a corresponding paging message carrying a PDSCH greater than or equal to one.

At 513, the base station 504 may transmit one or more paging messages associated with the plurality of UEs in the PO based on determining that each of the plurality of UEs sharing the PO supports the CSS. The UE 502 may receive the paging message associated with the UE 502 in the PO based on determining that each of the plurality of UEs sharing the PO supports the CSS.

In another aspect, the base station 504 may transmit, at 510, the PDCCH indication including a slot offset between a PDCCH scheduling the paging message and a corresponding paging message carrying a PDSCH set to zero based on determining that the plurality of UEs sharing the PO may include a first UE that does not support the CSS and a second UE that supports the CSS.

At 514, the UE 502 may change the state of the UE 502 from the CSS-enabled state to the CSS-disabled state based on the received PDCCH indication indicating that the slot offset is zero. That is, the UE 502 may change the state of the UE 502 from the CSS-enabled state to the CSS-disabled state in response to receiving, at 510, the PDCCH indication including a slot offset between a PDCCH scheduling the paging message and a corresponding paging message carrying a PDSCH being set to zero.

At 516, the UE 502 may monitor multiple consecutive POs subsequent to the first PO to receive the paging message. That is, the UE 502 may monitor subsequent POs to receive the paging message based on the slot offset signaled in the PDCCH indication being greater than or equal to one. The UE 502 may monitor each POs subsequent to the first PO until the UE 502 receives the paging message from the base station 504.

At 518, the base station 504 may transmit a paging message for each of the plurality of UEs in at least one of a first PO or a second PO based on whether the plurality of UEs supports CSS, and the UE 502 may receive the paging message for each of the plurality of UEs in at least one of the first PO or the second PO based on whether the plurality of UEs supports CSS. Since the plurality of UEs sharing the PO includes CSS-incapable UEs and CSS-capable UEs, the paging message for each of the plurality of UEs may include a first paging message transmitted in the first PO for the CSS-incapable UEs, and a second paging message transmitted in the second PO for the CSS-capable UEs, the second PO being different from the first PO. The first paging message may be transmitted in the same slot as the page, and the second paging message may be transmitted in the second PO, which is in a different slot than the page. Here, the first PO may be the PO shared by the plurality of UEs. The UE 502 may be one of the CSS-capable UEs, and the UE 502 may receive the second paging message in the second PO. The second PO may be subsequent to the first PO, and the second PO may be one of the multiple consecutive POs that the UE 502 monitors at 516, and the base station 504 may transmit the second paging message to the UE 502 that supports the CSS in each subsequent POs after the PO until the UE 502 receives the second paging message.

At 520, the UE 502 may change the state of the UE 502 from the CSS-disabled to the CSS-enabled state based on receiving the paging message in the second PO. That is, in response to receiving the paging message in the second PO at 518, the UE 502 may change the state of the UE 502 to the CSS-enabled state to return to operating with the CSS.

At 522, the UE 502 may determine or identify that the paging message was not received for N consecutive POs, N being an integer greater than zero, and at 524, the UE 502 may initiate a cell reselection procedure.

Figure 6:
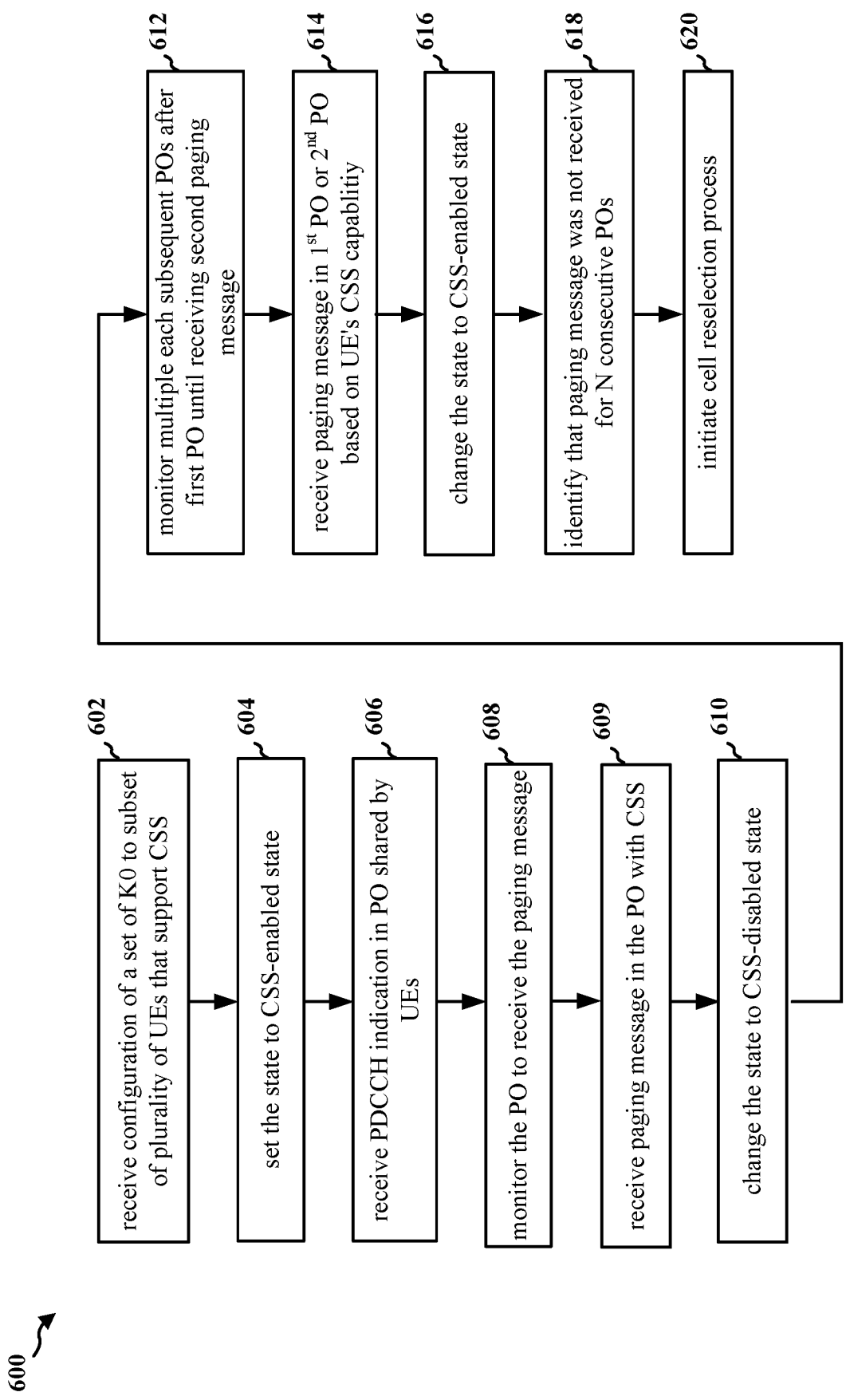
FIG. 6 is a flowchart of a method of wireless communication.

FIG. 6 is a flowchart 600 of a method of wireless communication. The method may be performed by a UE (e.g., the UE 104/502; the apparatus 1302). The UE may be a CSS-capable UE that supports the CSS, and may receive, from the base station, a paging message configured with slot offset of K0=0 while operating under the CSS.

At 602, the UE may receive a configuration of a set of slot offsets to a subset of the plurality of UEs that supports the CSS, where a minimum value of the set of slot offsets is greater than or equal to one. For example, the base station 504 may transmit the SIB1 including the IE, e.g., PDSCH-ConfigCommon, including a parameter pdsch-TimeDomainAllocationList configuring variables K0≥1. Here, the configuration may be transmitted via the SIB1. For example, at 506, the UE 502 may receive a configuration of a set of slot offsets to a subset of the plurality of UEs that supports the CSS, where a minimum value of the set of slot offsets is greater than or equal to one. Furthermore, 602 may be performed by a CSS managing component 1340.

At 604, the UE may set the state to CSS-enabled state based on receiving the configuration of the set of slot offsets including the minimum value of the set of slot offsets greater than or equal to one. For example, at 508, the UE 502 may set the state to CSS-enabled state based on receiving the configuration of the set of slot offsets including the minimum value of the set of slot offsets greater than or equal to one. Furthermore, 604 may be performed by the CSS managing component 1340.

At 606, the UE may receive a paging PDCCH indication, in a first PO, indicating a paging message available for the UE. In one aspect, the plurality of UEs sharing the PO may all support the CSS, and the PDCCH indication may include a slot offset between a PDCCH scheduling the paging message and a corresponding paging message carrying a PDSCH greater than or equal to one. In another aspect, the plurality of UEs sharing the PO may include a first UE that does not support the CSS and a second UE that supports the CSS, and the PDCCH indication may include a slot offset between a PDCCH scheduling the paging message and a corresponding paging message carrying a PDSCH set to zero. For example, at 510, the UE 502 may receive a paging PDCCH indication, in a first PO, indicating a paging message available for the UE 502. Furthermore, 606 may be performed by a paging message reception component 1342.

In one aspect, the base station may transmit, at 606, the PDCCH indication including a slot offset between a PDCCH scheduling the paging message and a corresponding paging message carrying a PDSCH greater than or equal to one based on determining that the plurality of UEs sharing the PO may all support the CSS.

At 608, the UE may monitor the first PO to receive the paging message with CSS based on the received configuration indicating that the slot offset being great than or equal to 1. That is, the UE may maintain the CSS-enabled state as set at 604, and monitor the first PO for the paging message with CSS in response to receiving, at 606, the PDCCH indication including a slot offset between a PDCCH scheduling the paging message and a corresponding paging message carrying a PDSCH greater than or equal to one. For example, at 512, the UE 502 may monitor the first PO to receive the paging message with CSS based on the received configuration indicating that the slot offset being great than or equal to 1. Furthermore, 608 may be performed by the paging message reception component 1342.

At 609, the UE may receive the paging message associated with the UE in the PO based on determining that each of the plurality of UEs sharing the PO supports the CSS. For example, at 513, the UE 502 may receive the paging message associated with the UE 502 in the PO. Furthermore, 609 may be performed by the paging message reception component 1342.

In another aspect, the base station may transmit, at 606, the PDCCH indication including a slot offset between a PDCCH scheduling the paging message and a corresponding paging message carrying a PDSCH set to zero based on determining that the plurality of UEs sharing the PO may include a first UE that does not support the CSS and a second UE that supports the CSS.

At 610, the UE may change the state of the UE from the CSS-enabled state to the CSS-disabled state based on the received PDCCH indication indicating that the slot offset is zero. That is, the UE may change the state of the UE from the CSS-enabled state to the CSS-disabled state in response to receiving, at 606, the PDCCH indication including a slot offset between a PDCCH scheduling the paging message and a corresponding paging message carrying a PDSCH being set to zero. For example, at 514, the UE 502 may change the state of the UE 502 from the CSS-enabled state to the CSS-disabled state. Furthermore, 610 may be performed by the CSS managing component 1340.

At 612, the UE may monitor multiple consecutive POs subsequent to the first PO to receive the paging message. That is, the UE may monitor subsequent POs to receive the paging message based on the slot offset signaled in the PDCCH indication being greater than or equal to one. The UE may monitor each POs subsequent to the first PO until the UE receives the paging message from the base station. For example, at 516, the UE 502 may monitor multiple consecutive POs subsequent to the first PO to receive the paging message. Furthermore, 612 may be performed by the paging message reception component 1342.

At 614, the UE may receive the paging message for each of the plurality of UEs in at least one of a first PO or a second PO based on whether the plurality of UEs supports CSS. Since the plurality of UEs sharing the PO includes CSS-incapable UEs and CSS-capable UEs, the paging message for each of the plurality of UEs may include a first paging message transmitted in the first PO for the CSS-incapable UEs, and a second paging message transmitted in the second PO for the CSS-capable UEs, the second PO being different from the first PO. The first paging message may be transmitted in the same slot as the page, and the second paging message may be transmitted in the second PO, which is in a different slot than the page. Here, the first PO may be the PO shared by the plurality of UEs. The UE may be one of the CSS-capable UEs, and the UE 502 may receive the second paging message in the second PO. The second PO may be subsequent to the first PO, and the second PO may be one of the multiple consecutive POs that the UE 502 monitors at 612, and the base station may transmit the second paging message to the UE that supports the CSS in each subsequent POs after the PO until the UE receives the second paging message. For example, at 518, the UE 502 may receive the paging message for each of the plurality of UEs in at least one of the first PO or the second PO based on whether the plurality of UEs supports CSS. Furthermore, 614 may be performed by the paging message reception component 1342.

At 616, the UE may change the state of the UE 502 from the CSS-disabled to the CSS-enabled state based on receiving the paging message in the second PO. That is, in response to receiving the paging message in the second PO at 518, the UE may change the state of the UE to the CSS-enabled state to return to operating with the CSS. For example, at 520, the UE 502 may change the state of the UE 502 from the CSS-disabled to the CSS-enabled state based on receiving the paging message in the second PO. Furthermore, 616 may be performed by the CSS managing component 1340.

At 618, the UE may determine or identify that the paging message was not received for N consecutive POs, N being an integer greater than zero. For example, at 522, the UE 502 may determine or identify that the paging message was not received for N consecutive POs, N being an integer greater than zero. Furthermore, 618 may be performed by the paging message reception component 1342.

At 620, the UE may initiate a cell reselection procedure. For example, at 524, the UE 502 may initiate the cell reselection procedure. Furthermore, 610 may be performed by a cell reselection component 1344.

Figure 7:
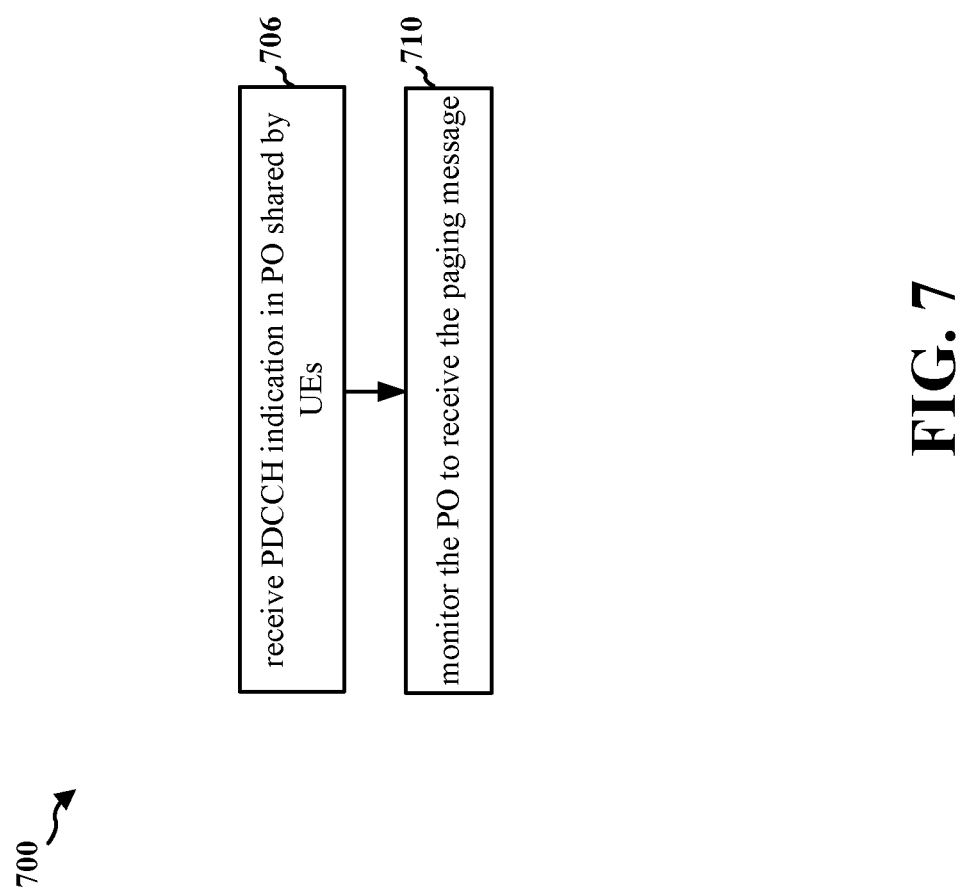
FIG. 7 is a flowchart of a method of wireless communication.

FIG. 7 is a flowchart 700 of a method of wireless communication. The method may be performed by a UE (e.g., the UE 104/502; the apparatus 1302). The UE may be a CSS-capable UE that supports the CSS, and may receive, from the base station, a paging message configured with slot offset of K0=0 while operating under the CSS.

At 706, the UE may receive a paging PDCCH indication, in a first PO, indicating a paging message available for the UE. In one aspect, the plurality of UEs sharing the PO may all support the CSS, and the PDCCH indication may include a slot offset between a PDCCH scheduling the paging message and a corresponding paging message carrying a PDSCH greater than or equal to one. In another aspect, the plurality of UEs sharing the PO may include a first UE that does not support the CSS and a second UE that supports the CSS, and the PDCCH indication may include a slot offset between a PDCCH scheduling the paging message and a corresponding paging message carrying a PDSCH set to zero. For example, at 510, the UE 502 may receive a paging PDCCH indication, in a first PO, indicating a paging message available for the UE 502. Furthermore, 706 may be performed by a paging message reception component 1342.

At 710, the UE may change the state of the UE from the CSS-enabled state to the CSS-disabled state based on the received PDCCH indication indicating that the slot offset is zero. That is, the UE may change the state of the UE from the CSS-enabled state to the CSS-disabled state in response to receiving, at 706, the PDCCH indication including a slot offset between a PDCCH scheduling the paging message and a corresponding paging message carrying a PDSCH being set to zero. For example, at 514, the UE 502 may change the state of the UE 502 from the CSS-enabled state to the CSS-disabled state. Furthermore, 710 may be performed by the CSS managing component 1340.

Figure 8:
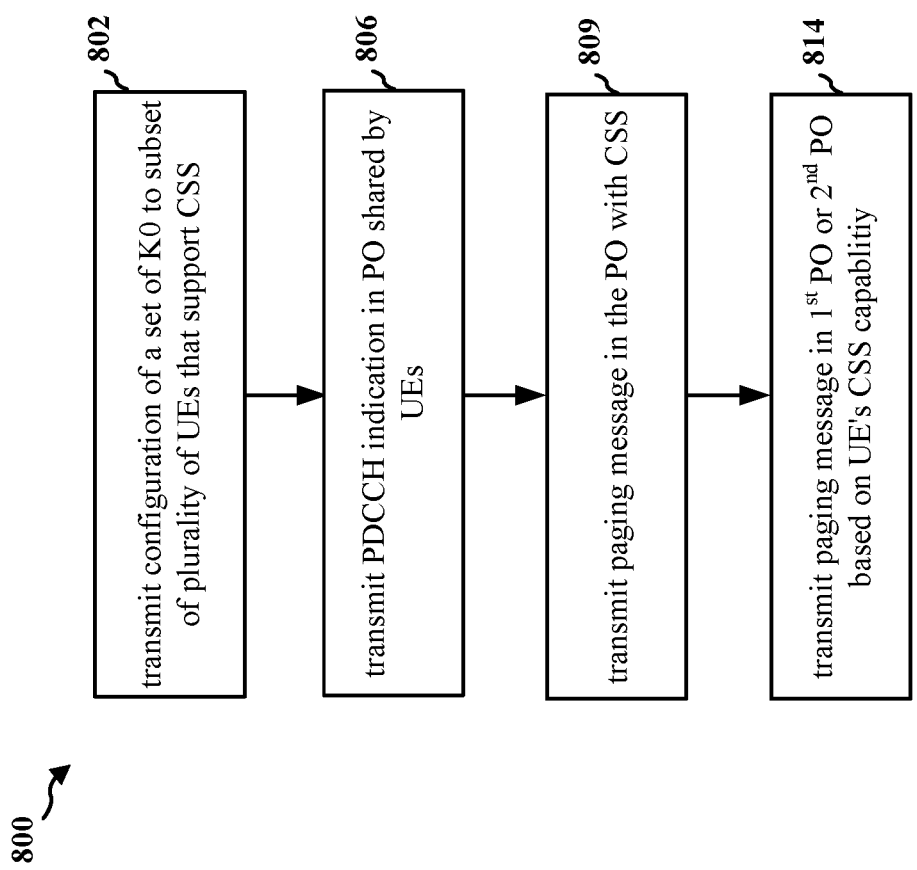
FIG. 8 is a flowchart of a method of wireless communication.

FIG. 8 is a flowchart 800 of a method of wireless communication. The method may be performed by a base station (e.g., the base station 102/180/404; the apparatus 1402). The base station may support the CSS, and may transmit paging messages for the one or more CSS-capable UEs and the one or more CSS-incapable UEs sharing the same PO without assigning dedicated PFs or POs.

At 802, the base station may transmit a configuration of a set of slot offsets to a subset of the plurality of UEs that supports the CSS, where a minimum value of the set of slot offsets is greater than or equal to one. For example, the base station may transmit the SIB1 including the IE, e.g., PDSCH-ConfigCommon, including a parameter pdsch-TimeDomainAllocationList configuring variables K0≥1. Here, the configuration may be transmitted via the SIB1. For example, at 506, the base station 504 may transmit a configuration of a set of slot offsets to a subset of the plurality of UEs that supports the CSS, where a minimum value of the set of slot offsets is greater than or equal to one. Furthermore, 802 may be performed by a CSS managing component 1440.

At 806, the base station may transmit a paging PDCCH indication in a PO to a plurality of UEs that share the PO. In one aspect, the plurality of UEs sharing the PO may all support the CSS, and the PDCCH indication may include a slot offset between a PDCCH scheduling the paging message and a corresponding paging message carrying a PDSCH greater than or equal to one. In another aspect, the plurality of UEs sharing the PO may include a first UE that does not support the CSS and a second UE that supports the CSS, and the PDCCH indication may include a slot offset between a PDCCH scheduling the paging message and a corresponding paging message carrying a PDSCH set to zero. For example, at 510, the base station 504 may transmit a paging PDCCH indication in a PO to a plurality of UEs that share the PO. Furthermore, 806 may be performed by a paging message transmission component 1442.

At 809, the base station may transmit one or more paging messages associated with the plurality of UEs in the PO based on determining that each of the plurality of UEs sharing the PO supports the CSS. For example, at 513, the base station 504 may transmit one or more paging messages associated with the plurality of UEs in the PO based on determining that each of the plurality of UEs sharing the PO supports the CSS. Furthermore, 804 may be performed by the paging message transmission component 1442.

At 814, the base station may transmit a paging message for each of the plurality of UEs in at least one of a first PO or a second PO based on whether the plurality of UEs supports CSS. Since the plurality of UEs sharing the PO includes CSS-incapable UEs and CSS-capable UEs, the paging message for each of the plurality of UEs may include a first paging message transmitted in the first PO for the CSS-incapable UEs, and a second paging message transmitted in the second PO for the CSS-capable UEs, the second PO being different from the first PO. The first paging message may be transmitted in the same slot as the page, and the second paging message may be transmitted in the second PO, which is in a different slot than the page. Here, the first PO may be the PO shared by the plurality of UEs. The second PO may be subsequent to the first PO. The base station may transmit the second paging message to the UE that supports the CSS in each subsequent POs after the PO until the UE receives the second paging message. For example, at 518, the base station 504 may transmit a paging message for each of the plurality of UEs in at least one of the first PO or the second PO based on whether the plurality of UEs supports CSS. Furthermore, 804 may be performed by the paging message transmission component 1442.

Figure 9:
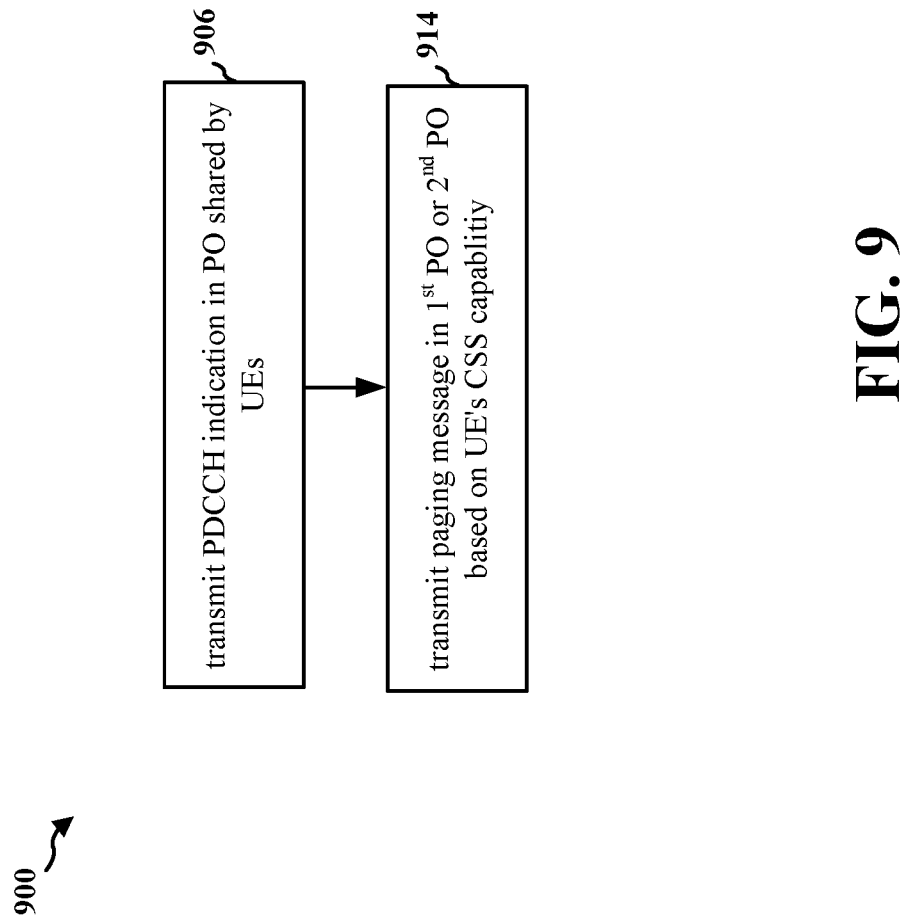
FIG. 9 is a flowchart of a method of wireless communication.

FIG. 9 is a flowchart 900 of a method of wireless communication. The method may be performed by a base station (e.g., the base station 102/180/404; the apparatus 1402). The base station may support the CSS, and may transmit paging messages for the one or more CSS-capable UEs and the one or more CSS-incapable UEs sharing the same PO without assigning dedicated PFs or POs.

At 906, the base station may transmit a paging PDCCH indication in a PO to a plurality of UEs that share the PO. In one aspect, the plurality of UEs sharing the PO may all support the CSS, and the PDCCH indication may include a slot offset between a PDCCH scheduling the paging message and a corresponding paging message carrying a PDSCH greater than or equal to one. In another aspect, the plurality of UEs sharing the PO may include a first UE that does not support the CSS and a second UE that supports the CSS, and the PDCCH indication may include a slot offset between a PDCCH scheduling the paging message and a corresponding paging message carrying a PDSCH set to zero. For example, at 510, the base station 504 may transmit a paging PDCCH indication in a PO to a plurality of UEs that share the PO. Furthermore, 906 may be performed by a paging message transmission component 1442.

At 914, the base station may transmit a paging message for each of the plurality of UEs in at least one of a first PO or a second PO based on whether the plurality of UEs supports CSS. Since the plurality of UEs sharing the PO includes CSS-incapable UEs and CSS-capable UEs, the paging message for each of the plurality of UEs may include a first paging message transmitted in the first PO for the CSS-incapable UEs, and a second paging message transmitted in the second PO for the CSS-capable UEs, the second PO being different from the first PO. The first paging message may be transmitted in the same slot as the page, and the second paging message may be transmitted in the second PO, which is in a different slot than the page. Here, the first PO may be the PO shared by the plurality of UEs. The second PO may be subsequent to the first PO. The base station may transmit the second paging message to the UE that supports the CSS in each subsequent POs after the PO until the UE receives the second paging message. For example, at 518, the base station 504 may transmit a paging message for each of the plurality of UEs in at least one of the first PO or the second PO based on whether the plurality of UEs supports CSS. Furthermore, 904 may be performed by the paging message transmission component 1442.

Figure 10:
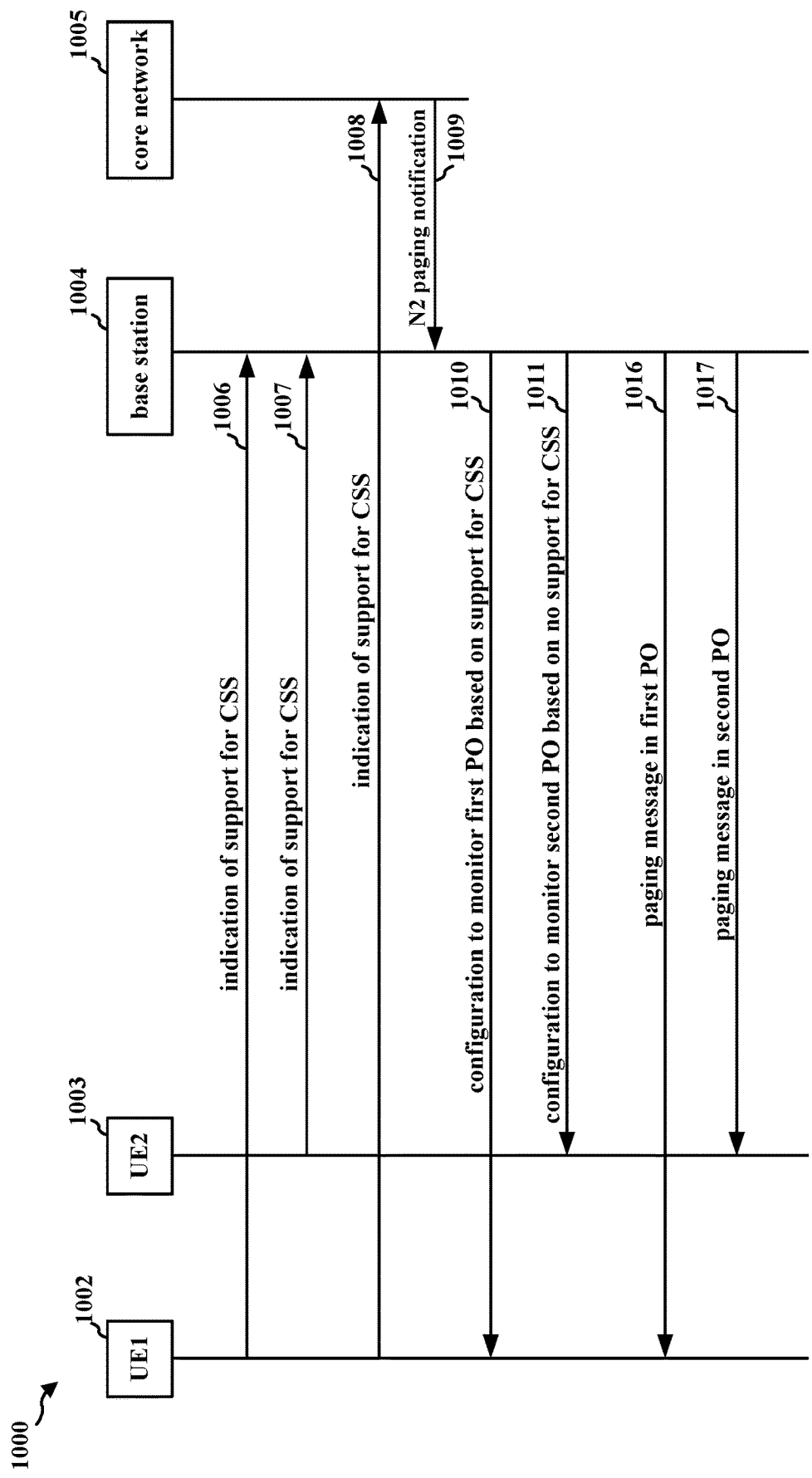
FIG. 10 is a communication diagram of a method of wireless communication.

FIG. 10 is a communication diagram 1000 of a method of wireless communication. The communication diagram 1000 may include a first UE 1002, a base station 1004, and a second UE 1003. Here, the first UE 1002 may be a CSS-capable UE that supports the CSS, the second UE 1003 may be a CSS-incapable UE that may not support the CSS, and the base station 1004 may support the CSS. The base station 1004 may assign the CSS-capable UEs and the CSS-incapable UEs to separate sets of PFs or POs.

At 1006, the first UE 1002 may transmit an indication of support for the CSS, and the base station 1004 may receive an indication of support by the first UE 1002 for the CSS. Here, the first UE 1002 may be the CSS-capable UE, and the first UE 1002 may indicate the base station 1004 that the first UE 1002 may support the CSS.

At 1007, the second UE 1003 may transmit an indication of support for the CSS, and the base station 1004 may receive an indication of support by the second UE 1003 for the CSS. Here, the second UE 1003 may be the CSS-incapable UE, and the second UE 1003 may indicate the base station 1004 that the second UE 1003 may not support the CSS.

At 1008, first UE 1002 and the second UE 1003 may transmit the indication of support of the CSS of the first UE 1002 and the second UE 1003 to a core network 1005, and at 1009, the base station 1004 may receive an N2 paging notification message from the core network 1005, the N2 paging notification message including an indication whether the first UE 1002 and the second UE 1003 support the CSS.

At 1010, the base station 1004 may configure the first UE 1002 to monitor a first PO based on the first UE 1002 supporting the CSS, the first PO being different than a second PO for the second UE 1003 that does not support the CSS. The first UE 1002 may receive the configuration to monitor the first PO based on the support for the CSS. Here, configuring the first UE 1002 may include transmitting a first configuration to the first UE 1002. In one aspect, the first configuration may include a parameter associated with a number of total paging frames in one DRX cycle and a paging frame offset based on the first UE 1002 supporting the CSS. In another aspect, the first configuration may include a parameter associated with a first PDCCH monitoring occasion for each PO based on the first UE 1002 supporting the CSS.

At 1011, the base station 1004 may configure the second UE 1003 to monitor the second PO based on the second UE 1003 not supporting the CSS, the second PO being different than the first PO for the first UE 1002 that supports the CSS. The second UE 1003 may receive the configuration to monitor the second PO based on the not supporting the CSS. Here, configuring the second UE 1003 may include transmitting a second configuration to the second UE 1003. In one aspect, the second configuration may include a parameter associated with a number of total paging frames in one DRX cycle and a paging frame offset based on the second UE 1003 not supporting the CSS. In another aspect, the second configuration may include a parameter associated with a first PDCCH monitoring occasion for each PO based on the second UE 1003 not supporting the CSS.

The first configuration and the second configuration may be set such that the first set of POs and the second set of POs may be orthogonal to each other. Accordingly, the first set of POs and the second set of POs may have different PF index or different PO index, and may not overlap with each other.

At 1016, the base station 1004 may transmit the paging message to the first UE 1002 in the first PO with the CSS and the slot offset K0≥1, and the first UE 1002 may receive the paging message from the base station 1004 in the first PO with the CSS.

At 1017, the base station 1004 may transmit the paging message to the second UE 1003 in the second PO without the CSS and the slot offset K0=0, and the second UE 1003 may receive the paging message from the base station 1004 in the second PO without the CSS.

Figure 11:
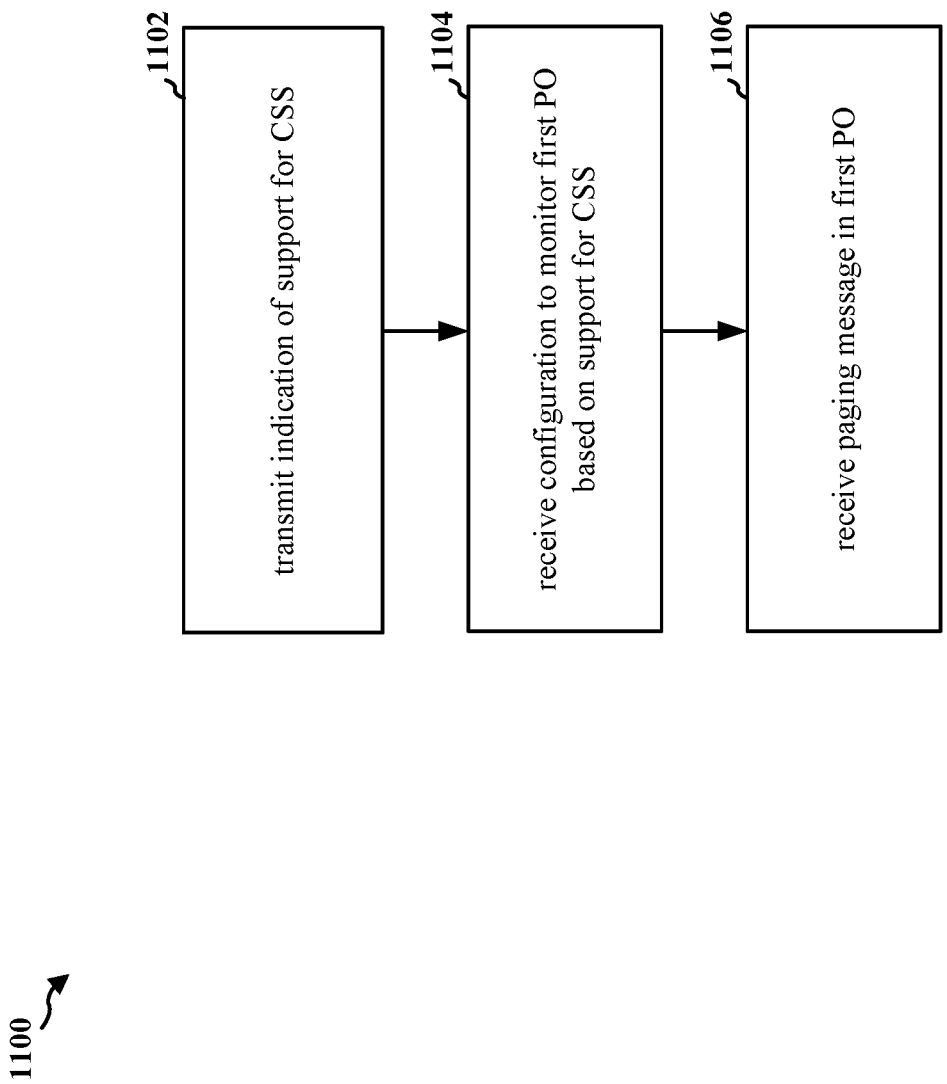
FIG. 11 is a flowchart of a method of wireless communication.

FIG. 11 is a flowchart 1100 of a method of wireless communication. The method may be performed by a UE (e.g., the UE 104/902; the apparatus 1302). The UE may be a CSS-capable UE that supports the CSS.

At 1102, the UE may transmit an indication of support for the CSS of the first UE. Here, the first UE may be the CSS-capable UE, and the first UE may indicate the base station or the core network that the first UE may support the CSS. For example, at 1006 or 1008, the first UE 1002 may transmit an indication of support for the CSS of the first UE 1002 to the base station 1004 or the core network 1005. Furthermore, 1102 may be performed by a CSS managing component 1340.

At 1104, the UE may receive a configuration to monitor a first PO based on the UE supporting the CSS. The UE may receive the configuration to monitor the first PO based on the support for the CSS. Here, configuring the first UE may include transmitting a first configuration to the first UE. In one aspect, the first configuration may include a parameter associated with a number of total paging frames in one DRX cycle and a paging frame offset based on the UE supporting the CSS. In another aspect, the first configuration may include a parameter associated with a first PDCCH monitoring occasion for each PO based on the UE supporting the CSS. For example, at 1010, the first UE 1002 may receive a configuration to monitor a first PO based on the first UE 1002 supporting the CSS, the first PO being different than a second PO for the second UE 1003 that does not support the CSS. Furthermore, 1104 may be performed by a paging message reception component 1342.

At 1106, the UE may receive the paging message from the base station in the first PO with the CSS. For example, at 1016, the first UE 1002 may receive the paging message from the base station 1004 in the first PO with the CSS. Furthermore, 1106 may be performed by the paging message reception component 1342.

Figure 12:
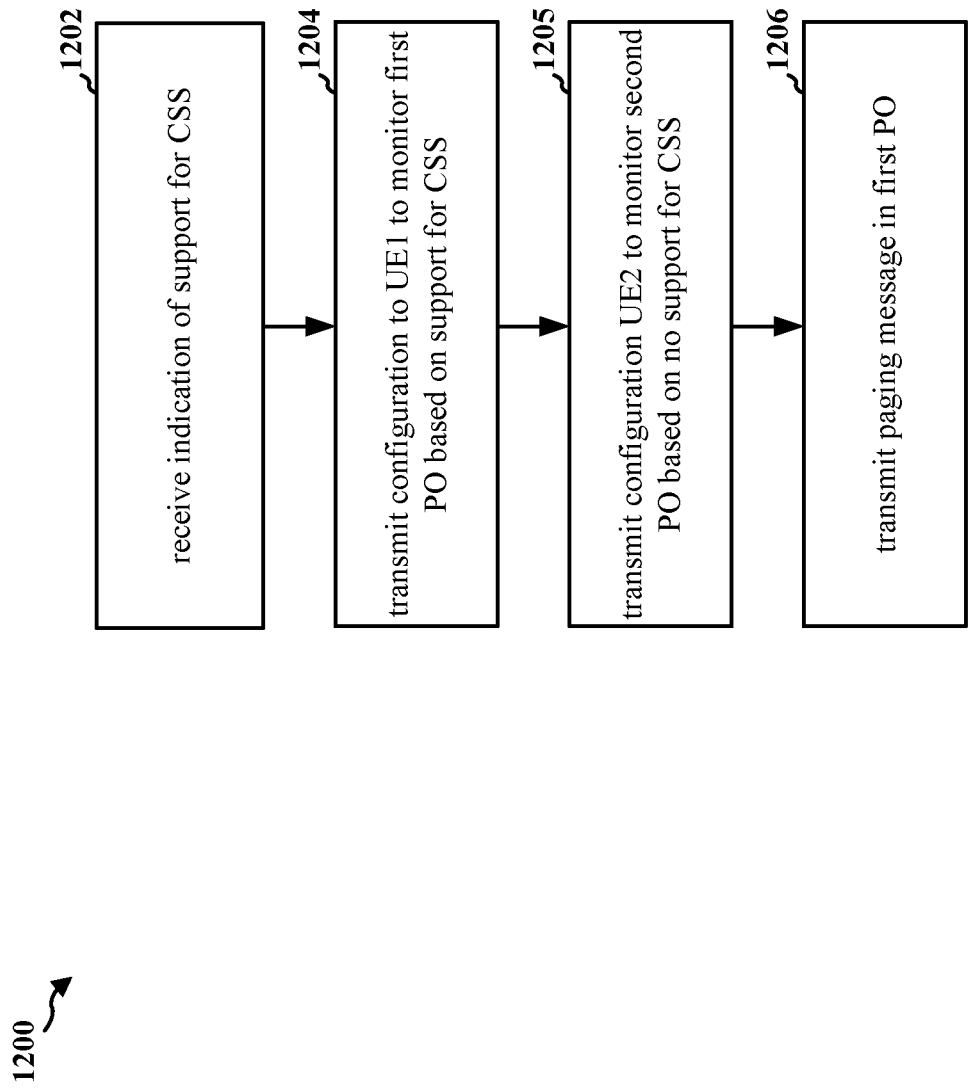
FIG. 12 is a flowchart of a method of wireless communication.

FIG. 12 is a flowchart 1200 of a method of wireless communication. The method may be performed by a base station (e.g., the base station 102/180/904; the apparatus 1402). The base station 1004 may support the CSS. The base station 1004 may assign the CSS-capable UEs and the CSS-incapable UEs to separate sets of PFs or POs.

At 1202, the base station may receive at least one indication of support for the CSS by multiple UEs. In one aspect, the base station may receive an indication of support for the CSS from a first UE with the CSS capability and an indication of support for the CSS from a second UE without the CSS capability. In another aspect, the base station may receive an N2 paging notification message from a core network, the N2 paging notification message including an indication whether the first UE and the second UE support the CSS. For example, at 1006, 1007, or 1009, the base station 1004 may receive at least one indication of support for the CSS by multiple UEs from the first UE 1002, the second UE 1003, or the core network 1005. Furthermore, 1202 may be performed by a CSS managing component 1440.

At 1204, the base station may configure the first UE to monitor a first PO based on the first UE supporting the CSS. Here, configuring the first UE may include transmitting a first configuration to the first UE. In one aspect, the first configuration may include a parameter associated with a number of total paging frames in one DRX cycle and a paging frame offset based on the first UE supporting the CSS. In another aspect, the first configuration may include a parameter associated with a first PDCCH monitoring occasion for each PO based on the first UE supporting the CSS. For example, at 1010, the base station 1004 may configure the first UE 1002 to monitor a first PO based on the first UE 1002 supporting the CSS. Furthermore, 1204 may be performed by a paging message transmission component 1442.

At 1205, the base station may configure the second UE to monitor the second PO based on the second UE not supporting the CSS. Here, configuring the second UE 1003 may include transmitting a second configuration to the second UE. In one aspect, the second configuration may include a parameter associated with a number of total paging frames in one DRX cycle and a paging frame offset based on the second UE not supporting the CSS. In another aspect, the second configuration may include a parameter associated with a first PDCCH monitoring occasion for each PO based on the second UE not supporting the CSS. For example, at 1011, the base station 1004 may configure the second UE 1003 to monitor the second PO based on the second UE 1003 not supporting the CSS, the second PO being different than the first PO for the first UE 1002 that supports the CSS. Furthermore, 1205 may be performed by the paging message transmission component 1442.

The first configuration and the second configuration may be set such that the first set of POs and the second set of POs may be orthogonal to each other. Accordingly, the first set of POs and the second set of POs may have different PF index or different PO index, and may not overlap with each other.

At 1206, the base station may transmit the paging message to the first UE in the first PO with the CSS and the slot offset K0≥1 and the paging message to the second UE in the second PO without the CSS and the slot offset K0=0. For example, at 1016 or 1017, the base station 1004 may transmit the paging message to the first UE 1002 in the first PO with the CSS and the slot offset K0≥1 and the paging message to the second UE 1003 in the second PO without the CSS and the slot offset K0=0. Furthermore, 1206 may be performed by the paging message transmission component 1442.

Figure 13:
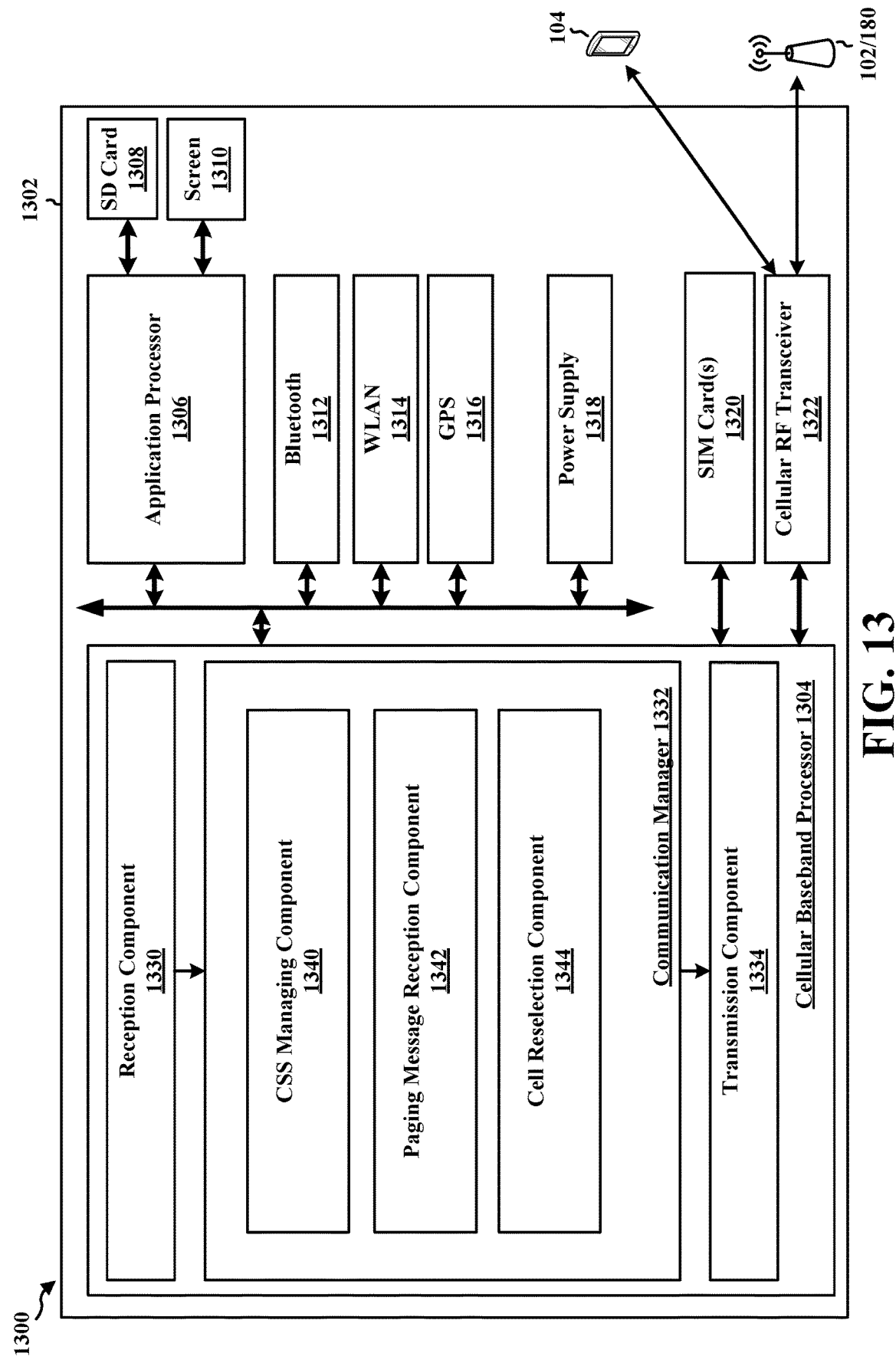
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1202 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a CSS managing component 1340 that is configured to receive a configuration of a set of slot offsets to a subset of the plurality of UEs that supports the CSS, set the state to CSS-enabled state based on receiving the configuration of the set of slot offsets including the minimum value of the set of slot offsets greater than or equal to one, change the state of the UE from the CSS-enabled state to the CSS-disabled state, change the state of the UE 502 from the CSS-disabled to the CSS-enabled state based on receiving the paging message in the second PO, and transmit an indication of support for the CSS of the first UE, e.g., as described in connection with 602, 604, 610, 616, 710, and 1102. The communication manager 1332 further includes a paging message reception component 1342 that is configured to receive a paging PDCCH indication, in a first PO, indicating a paging message available for the UE, monitor the first PO to receive the paging message with CSS based on the received configuration indicating that the slot offset being great than or equal to 1, receive the paging message associated with the UE in the PO based on determining that each of the plurality of UEs sharing the PO supports the CSS, monitor multiple consecutive POs subsequent to the first PO to receive the paging message, receive the paging message for each of the plurality of UEs in at least one of a first PO or a second PO based on whether the plurality of UEs supports CSS, determine or identify that the paging message was not received for N consecutive POs, N being an integer greater than zero, monitor a first PO based on the UE supporting the CSS, and receive the paging message from the base station in the first PO with the CSS, e.g., as described in connection with 606, 608, 609, 612, 614, 618, 706, 1104, and 1106. The communication manager 1332 further includes a cell reselection component 1344 that is configured to may initiate a cell reselection procedure, e.g., as described in connection with 620.

The apparatus may include additional components that perform each of the blocks of the algorithm in the flowcharts of FIGS. 5, 6, 7, 10, and 11. As such, each block in the flowcharts of FIGS. 5, 6, 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving a paging PDCCH indication, in a first PO, indicating a paging message available for the UE, and means for monitoring the PO to receive the paging message if a slot offset signaled in the PDCCH indication is greater than or equal to one or a second PO to receive the paging message if the slot offset is zero, the second PO being different from the first PO. The apparatus 1302 includes means for monitoring multiple consecutive POs subsequent to the first PO to receive the paging message, and means for monitor the first PO to receive the paging message based on the received configuration indicating that the slot offset being great than or equal to 1. The apparatus 1302 includes means for determining or identifying that the paging message was not received for N consecutive POs, N being an integer greater than zero, and means for initiating a cell reselection procedure. The apparatus 1302 includes means for changing a state of the UE from a CSS-enabled state to a CSS-disabled state based on the received PDCCH indication indicating that the slot offset is zero, and means for changing the state of the UE from the CSS-disabled to the CSS-enabled state based on receiving the paging message in the second PO. The apparatus 1302 includes means for transmitting an indication of support for CSS, and means for receiving a configuration to monitor a PO based on the support for the CSS, the PO being different than a set of POs for UEs that do not support the CSS. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
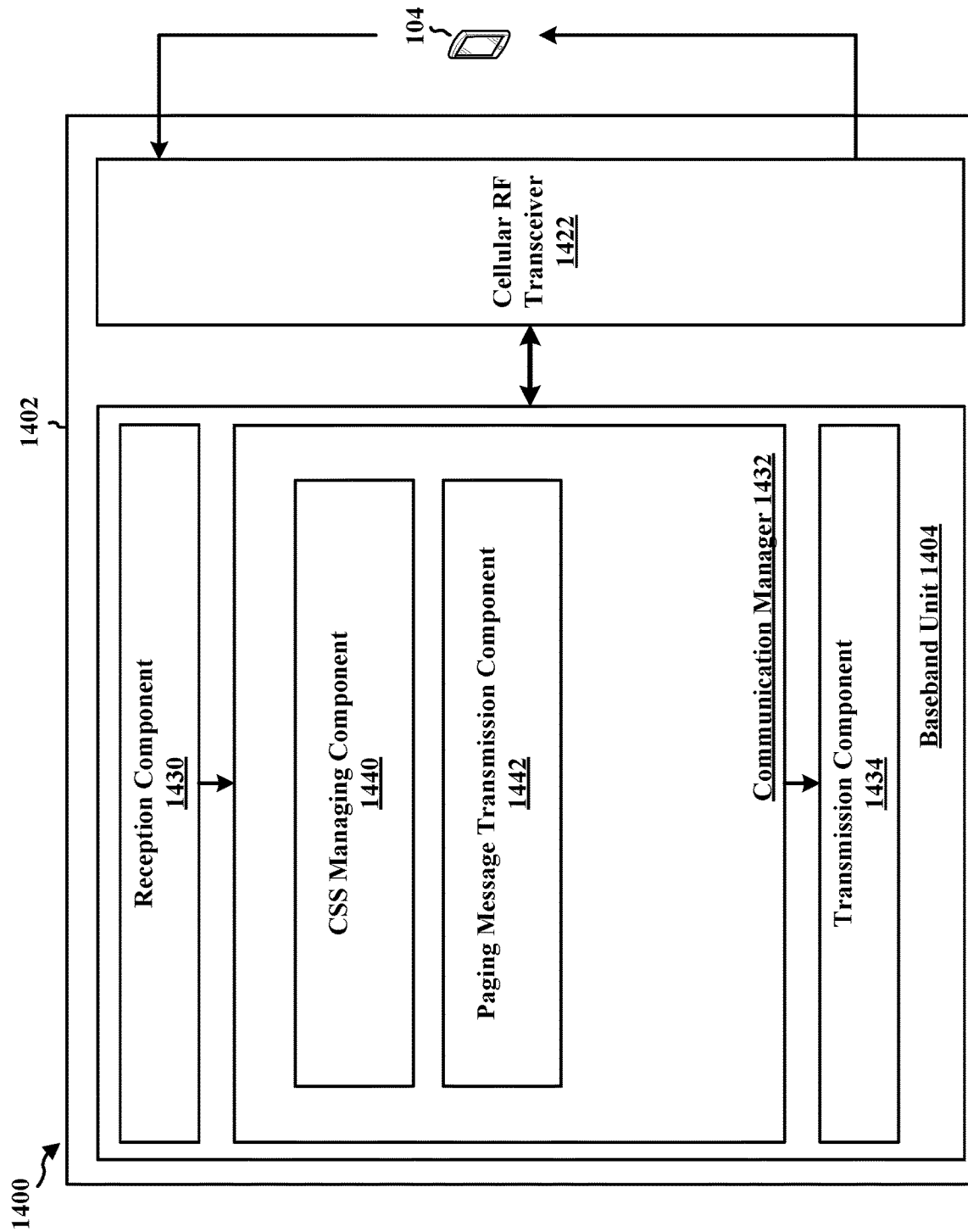
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a CSS managing component 1440 that is configured to transmit a configuration of a set of slot offsets to a subset of the plurality of UEs that supports the CSS, where a minimum value of the set of slot offsets is greater than or equal to one, and receive at least one indication of support for the CSS by multiple UEs, e.g., as described in connection with 802 and 1202. The communication manager 1432 further includes a paging message transmission component 1442 that is configured to transmit a paging PDCCH indication in a PO to a plurality of UEs that share the PO, transmit one or more paging messages associated with the plurality of UEs in the PO based on determining that each of the plurality of UEs sharing the PO supports the CSS, transmit a paging message for each of the plurality of UEs in at least one of a first PO or a second PO based on whether the plurality of UEs supports CSS, configure the first UE to monitor a first PO based on the first UE supporting the CSS, configure the second UE to monitor the second PO based on the second UE not supporting the CSS, transmit the paging message to the first UE in the first PO with the CSS and the slot offset K0≥1 and the paging message to the second UE in the second PO without the CSS and the slot offset K0=0, e.g., as described in connection with 806, 809, 814, 906, 914, 1204, 1205, and 1206.

The apparatus may include additional components that perform each of the blocks of the algorithm in the flowcharts of FIGS. 5, 8, 9, 10, and 12. As such, each block in the flowcharts of FIGS. 5, 8, 9, 10, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting a paging PDCCH indication in a PO to a plurality of UEs that share the PO, and means for transmitting a paging message for each of the plurality of UEs in at least one of a first PO or a second PO based on whether the plurality of UEs supports CSS. The apparatus 1402 includes means for transmitting a configuration of a set of slot offsets to a subset of the plurality of UEs that supports the CSS, where a minimum value of the set of slot offsets is greater than or equal to one. The apparatus 1402 includes means for transmitting one or more paging messages associated with the plurality of UEs in the PO based on determining that each of the plurality of UEs support the CSS, and means for transmitting the second paging message to the UE that supports the CSS in multiple consecutive POs after the PO. The apparatus 1402 includes means for receiving an indication of support by a UE for CSS, and means for configuring the UE to monitor a PO based on the support for the CSS, the PO being different than a set of POs for UEs that do not support the CSS. The apparatus 1402 includes means for configuring the UE with a parameter associated with a number of total paging frames in one DRX cycle and a paging frame offset based on the UE supporting the CSS, and means for configuring the UE with a parameter associated with a first PDCCH monitoring occasion for each PO based on the UE supporting the CSS. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

A first UE that does not support the CSS and a second UE that supports the CSS may share a PO, and a base station that supports CSS may configure a set of K0 greater than zero to the second UE. The base station may transmit a paging PDCCH indication in the shared PO to a plurality of UEs that share the PO and transmit a paging message for each of the plurality of UEs in the shared PO or a subsequent PO based on whether the plurality of UEs supports CSS. The base station may transmit a first paging message for the first UE in the shared PO with K=0 and a second paging message for the second UE transmitted in the subsequent PO.

The first UE may receive a paging scheduling PDCCH with K0=0 in the shared PO and monitor consecutive POs subsequent to the shared PO to receive the paging message. In some aspects, the UE may determine or identify that the paging message was not received for N consecutive POs and initiate a cell reselection procedure.

In some aspects, the base station may also assign separate sets of POs to the first UE and the second UE. The base station may transmit separate sets of parameters of PO to the first UE and the second UE, assigning a first PO or a first PF to the first UE and assigning a second PO or a second PF to the second UE. The first PO and the second PO may be orthogonal to each other.

In one aspect, the set of parameters may include a parameter associated with a number of total paging frames in one DRX cycle and a paging frame offset for determining an index number of PF. In another aspect, the set of parameters may include a parameter associated with a first PDCCH monitoring occasion for each PO for determining an index of the PO.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a network entity, including at least one processor coupled to a memory and configured to transmit a paging PDCCH indication in a PO to a plurality of UEs that share the PO, and transmit a paging message for each of the plurality of UEs in at least one of a first PO or a second PO based on whether the plurality of UEs supports CSS.

Aspect 2 is the apparatus of aspect 1, where the plurality of UEs sharing the PO includes a first UE that does not support the CSS and a second UE that supports the CSS, and the transmission of the paging message for each of the plurality of UEs includes a first paging message transmitted in the first PO for the first UE that does not support the CSS, and a second paging message transmitted in the second PO for the second UE that supports the CSS, the second PO being different from the first PO.

Aspect 3 is the apparatus of aspect 2, where the PDCCH indication includes a slot offset between a PDCCH scheduling the paging message and a corresponding paging message carrying a paging PDSCH being set to zero, and where the first paging message is transmitted in a same slot as the paging PDCCH, and the second paging message is transmitted in the second PO, which is in a different slot than the paging PDCCH.

Aspect 4 is the apparatus of any of aspects 1 to 3, further including transmitting a configuration of a set of slot offsets to a subset of the plurality of UEs that supports the CSS, where a minimum value of the set of slot offsets is greater than or equal to one.

Aspect 5 is the apparatus of aspect 4, where the configuration is transmitted via SIB1.

Aspect 6 is the apparatus of any of aspects 2 to 4, where the first PO is the PO shared by the plurality of UEs.

Aspect 7 is the apparatus of any of aspects 2 to 5, where the second PO is subsequent to the first PO.

Aspect 8 is the apparatus of any of aspects 1 to 7, where the at least one processor and the memory are further configured to transmit one or more paging messages associated with the plurality of UEs in the PO based on determining that each of the plurality of UEs support the CSS, where a slot offset between a paging PDCCH scheduling the paging messages associated with the plurality of UEs and a paging PDSCH carrying the paging message associated with the plurality of UEs is greater than or equal to one.

Aspect 9 is the apparatus of any of aspects 1 to 8, where the at least one processor and the memory are further configured to transmit the second paging message to the UE that supports the CSS in each subsequent POs after the PO until the UE receives the second paging message.

Aspect 10 is the apparatus of any of aspects 1 to 9, further including at least one transceiver coupled to the at least one processor.

Aspect 11 is the apparatus of any of aspects 1 to 10, further including at least one antenna coupled to the at least one processor.

Aspect 12 is a method of wireless communication for implementing any of aspects 1 to 9.

Aspect 13 is an apparatus for wireless communication including means for implementing any of aspects 1 to 9.

Aspect 14 is a computer-readable medium storing computer executable code, where the code when executed by a processor causes the processor to implement any of aspects 1 to 9.

Aspect 15 is an apparatus for wireless communication including at least one processor coupled to a memory and configured to receive an indication of support by a user equipment (UE) for CSS, and configure the UE to monitor a PO based on the support for the CSS, the PO being different than a set of POs for UEs that do not support the CSS.

Aspect 16 is the apparatus of aspect 15, where the at least one processor and the memory are further configured to configure the UE with a parameter associated with a number of total paging frames in one DRX cycle and a paging frame offset based on the UE supporting the CSS.

Aspect 17 is the apparatus of aspect 15 or 16, where the at least one processor and the memory are further configured to configure the UE with a parameter associated with a first PDCCH monitoring occasion for each PO based on the UE supporting the CSS.

Aspect 18 is the apparatus of any of aspects 14 to 17, further including at least one transceiver coupled to the at least one processor.

Aspect 19 is the apparatus of any of aspects 14 to 18, further including at least one antenna coupled to the at least one processor.

Aspect 20 is a method of wireless communication for implementing any of aspects 14 to 17.

Aspect 21 is an apparatus for wireless communication including means for implementing any of aspects 14 to 17.

Aspect 22 is a computer-readable medium storing computer executable code, where the code when executed by a processor causes the processor to implement any of aspects 14 to 17.

Aspect 23 is an apparatus for wireless communication including at least one processor coupled to a memory and configured to receive a paging PDCCH indication, in a first PO, indicating a paging message available for the UE, and monitor the PO to receive the paging message if a slot offset signaled in the PDCCH indication is greater than or equal to one or a second PO to receive the paging message if the slot offset is zero, the second PO being different from the first PO.

Aspect 24 is the apparatus of aspect 23, where the slot offset includes the slot offset between a PDCCH scheduling the paging message and a corresponding paging message carrying a PDSCH.

Aspect 25 is the apparatus of aspect 24, where the paging PDCCH and the paging PDSCH of the paging message are received in a single slot in the second PO.

Aspect 26 is the apparatus of any of aspects 23 to 25, where the at least one processor and the memory are further configured to monitor each POs subsequent to the first PO until the UE receives the paging message.

Aspect 27 is the apparatus of aspect 26, where the at least one processor and the memory are further configured to identify that the paging message was not received for N consecutive POs, N being an integer greater than zero, and initiate a cell reselection procedure.

Aspect 28 is the apparatus of any of aspects 23 to 27, where the at least one processor and the memory configured to monitor the second PO to receive the paging message further includes change a state of the UE from a CSS-enabled state to a CSS-disabled state based on the received PDCCH indication indicating that the slot offset is zero, and change the state of the UE from the CSS-disabled to the CSS-enabled state based on receiving the paging message in the second PO.

Aspect 29 is the apparatus of aspect 28, where the second PO is monitored with the CSS based on the UE being in the CSS-enabled state.

Aspect 30 is the apparatus of aspect 28, where the second PO is monitored without the CSS based on the UE being in the CSS-disabled state.

Aspect 31 is the apparatus of any of aspects 23 to 28, where the at least one processor and the memory are further configured to monitor the first PO to receive the paging message based on the received configuration indicating that the slot offset being great than or equal to 1.

Aspect 32 is the apparatus of any of aspects 23 to 31, further including at least one transceiver coupled to the at least one processor.

Aspect 33 is the apparatus of any of aspects 23 to 32, further including at least one antenna coupled to the at least one processor.

Aspect 34 is a method of wireless communication for implementing any of aspects 23 to 31.

Aspect 35 is an apparatus for wireless communication including means for implementing any of aspects 23 to 31.

Aspect 36 is a computer-readable medium storing computer executable code, where the code when executed by a processor causes the processor to implement any of aspects 23 to 31.

Aspect 37 is an apparatus for wireless communication including at least one processor coupled to a memory and configured to transmit an indication of support for CSS, and receive a configuration to monitor a PO based on the support for the CSS, the PO being different than a set of POs for UEs that do not support the CSS.

Aspect 38 is the apparatus of aspect 37, where the configuration includes a parameter associated with a number of total paging frames in one DRX cycle and a paging frame offset based on the UE supporting the CSS.

Aspect 39 is the apparatus of aspect 37 and 38, where the configuration includes a parameter associated with a first PDCCH monitoring occasion for each PO based on the UE supporting the CSS.

Aspect 40 is the apparatus of any of aspects 37 to 39, further including at least one transceiver coupled to the at least one processor.

Aspect 41 is the apparatus of any of aspects 37 to 40, further including at least one antenna coupled to the at least one processor.

Aspect 42 is a method of wireless communication for implementing any of aspects 37 to 39.

Aspect 43 is an apparatus for wireless communication including means for implementing any of aspects 37 to 39.

Aspect 44 is a computer-readable medium storing computer executable code, where the code when executed by a processor causes the processor to implement any of aspects 37 to 39.

What is claimed is:

1. An apparatus for wireless communication at a network entity, comprising:
at least one memory comprising instructions; and
at least one processor configured to execute the instructions to cause the apparatus to:
output for transmission a paging physical downlink control channel (PDCCH) indication in a paging occasion (PO) associated with a plurality of user equipments (UEs) that share the PO; and
output for transmission a one or more paging messages associated with the plurality of UEs in at least one of a first PO or a second PO based on whether the plurality of UEs supports cross-slot scheduling (CSS), wherein the plurality of UEs includes a first UE that does not support the CSS and a second UE that supports the CSS, and the output comprises:
outputting for transmission a first paging message in the first PO associated with the first UE that does not support the CSS; and
outputting for transmission a second paging message in the second PO associated with the second UE that supports the CSS, the second PO being different from the first PO.

2. The apparatus of claim 1, wherein the PDCCH indication includes a slot offset between a PDCCH scheduling the one or more paging messages and a a paging physical downlink shared channel (PDSCH) carrying the one or more paging messages being set to zero, and
wherein the first paging message is outputted for transmission in a same slot as the paging PDCCH indication, and the second paging message is outputted for transmission in a different slot.

3. The apparatus of claim 1, wherein the first PO is the PO shared by the plurality of UEs.

4. The apparatus of claim 1, wherein the second PO is subsequent to the first PO.

5. The apparatus of claim 1, wherein the at least one processor is further configured to cause the apparatus to:
output for transmission the second paging message for the second UE that supports the CSS in each of one or more subsequent POs after the PO until the second UE receives the second paging message.

6. The apparatus of claim 1, wherein the at least one processor is further configured to cause the apparatus to output for transmission a configuration of a set of slot offsets for a subset of the plurality of UEs that supports the CSS, wherein a minimum value of the set of slot offsets is greater than or equal to one.

7. The apparatus of claim 6, wherein the configuration is outputted for transmission via a system information block 1 (SIB1).

8. The apparatus of claim 1 further comprising:
at least one transceiver configured to transmit the paging PDCCH indication and the one or more paging messages, wherein the apparatus is configured as a network entity.

9. A method for wireless communication at a network entity, comprising:
outputting for transmission a paging physical downlink control channel (PDCCH) indication in a paging occasion (PO) associated with a plurality of user equipments (UEs) that share the PO; and
outputting for transmission a one or more paging messages associated with the plurality of UEs in at least one of a first PO or a second PO based on whether the plurality of UEs supports cross-slot scheduling (CSS), wherein the plurality of UEs includes a first UE that does not support the CSS and a second UE that supports the CSS, and the output comprises:
outputting for transmission a first paging message in the first PO associated with the first UE that does not support the CSS; and
outputting for transmission a second paging message in the second PO associated with the second UE that supports the CSS, the second PO being different from the first PO.

10. The method of claim 9, wherein the paging PDCCH indication includes a slot offset between a PDCCH scheduling the one or more paging messages and a a paging physical downlink shared channel (PDSCH) carrying the one or more paging messages being set to zero, and
wherein the first paging message is outputted for transmission in a same slot as the paging PDCCH indication, and the second paging message is outputted for transmission in a different slot.

11. The method of claim 9, wherein the first PO is the PO shared by the plurality of UEs.

12. The method of claim 9, wherein the second PO is subsequent to the first PO.

13. The method of claim 9, further comprising:
outputting for transmission a configuration of a set of slot offsets associated with a subset of the plurality of UEs that supports the CSS, wherein a minimum value of the set of slot offsets is greater than or equal to one.

14. The method of claim 13, wherein the configuration is outputted for transmission via a system information block 1 (SIB1).

15. The method of claim 9, further comprising:
outputting for transmission the second paging message to the second UE that supports the CSS in each of one or more subsequent POs after the PO until the second UE receives the second paging message.

16. An apparatus for wireless communication, comprising:
at least one memory comprising instructions; and
at least one processor configured to execute the instructions to cause the apparatus to:
output for transmission a paging physical downlink control channel (PDCCH) indication in a paging occasion (PO) associated with a plurality of user equipments (UEs) that share the PO; and output for transmission one or more paging messages associated with the plurality of UEs in at least one of a first PO or a second PO based on the plurality of UEs supporting cross-slot scheduling (CSS), wherein:
a slot offset between a PDCCH scheduling the one or more paging messages and a paging physical downlink shared channel (PDSCH) carrying the one or more paging messages is greater than or equal to one.

17. The apparatus of claim 16, wherein the at least one processor is further configured to cause the apparatus to output for transmission a configuration of a set of slot offsets associated with a subset of the plurality of UEs that supports the CSS, wherein a minimum value of the set of slot offsets is greater than or equal to one.

18. The apparatus of claim 17, wherein the configuration is outputted for transmission via a system information block 1 (SIB1).

19. The apparatus of claim 16 further comprising:
at least one transceiver configured to transmit the paging PDCCH indication and the one or more paging messages, wherein the apparatus is configured as a network entity.

20. A method for wireless communication at a network entity, comprising:
outputting for transmission a paging physical downlink control channel (PDCCH) indication in a paging occasion (PO) associated with a plurality of user equipments (UEs) that share the PO; and
outputting for transmission one or more paging messages associated with the plurality of UEs in at least one of a first PO or a second PO based on the plurality of UEs supporting cross-slot scheduling (CSS), wherein:
a slot offset between a PDCCH scheduling the one or more paging messages and a paging physical downlink shared channel (PDSCH) carrying the one or more paging messages is greater than or equal to one.

21. The method of claim 20, further comprising:
outputting for transmission a configuration of a set of slot offsets associated with a subset of the plurality of UEs that supports the CSS, wherein a minimum value of the set of slot offsets is greater than or equal to one.

22. The method of claim 21, wherein the configuration is outputted for transmission via a system information block 1 (SIB1).

* * * * *